US011389041B2

(12) United States Patent
Caspar

(10) Patent No.: US 11,389,041 B2
(45) Date of Patent: Jul. 19, 2022

(54) ENERGY STORAGE MODULE FOR A HAND-HELD POWER TOOL

(71) Applicant: Festool GmbH, Wendlingen (DE)

(72) Inventor: Moritz Caspar, Stuttgart (DE)

(73) Assignee: FESTOOL GMBH, Wendlingen (DE)

( * ) Notice: Subject to any disclaimer, the term of this patent is extended or adjusted under 35 U.S.C. 154(b) by 405 days.

(21) Appl. No.: 16/619,812

(22) PCT Filed: Jun. 7, 2018

(86) PCT No.: PCT/EP2018/065098
§ 371 (c)(1),
(2) Date: Dec. 5, 2019

(87) PCT Pub. No.: WO2018/224625
PCT Pub. Date: Dec. 13, 2018

(65) Prior Publication Data
US 2021/0282615 A1   Sep. 16, 2021

(30) Foreign Application Priority Data

Jun. 8, 2017 (DE) .......................... 102017112705.4
Jun. 8, 2017 (DE) .......................... 102017112707.0
(Continued)

(51) Int. Cl.
*H02J 7/00* (2006.01)
*A47L 9/28* (2006.01)
(Continued)

(52) U.S. Cl.
CPC ........... *A47L 9/2884* (2013.01); *A47L 9/2873* (2013.01); *A47L 9/2894* (2013.01); *G08C 17/00* (2013.01);
(Continued)

(58) Field of Classification Search
USPC ......................... 320/107, 108, 123, 124, 125
See application file for complete search history.

(56) References Cited

U.S. PATENT DOCUMENTS

| 2010/0199453 | A1 | 8/2010 | Brotto et al. | |
| 2016/0325391 | A1* | 11/2016 | Stampfl | ............... B25F 5/00 |
| 2017/0193761 | A1* | 7/2017 | Suzuki | ............... H04B 1/03 |

FOREIGN PATENT DOCUMENTS

| CN | 103703651 A | * | 4/2014 | ............... B25F 3/00 |
| CN | 103702803 B | * | 5/2016 | ............... B23Q 5/54 |

(Continued)

OTHER PUBLICATIONS

Examination Report from the Chinese Patent Application dated Aug. 19, 2020.

*Primary Examiner* — Brian Ngo
(74) *Attorney, Agent, or Firm* — Hoffmann & Baron, LLP

(57) ABSTRACT

An energy storage module for use with an electric device in the shape of an electric hand-held machine tool or a vacuum cleaner, with the energy storage module having a wireless communication interface for wireless communication with an external communication apparatus arranged remote from the energy storage module and a module housing in which an electric storage device with at least one electrically rechargeable storage cell is arranged and on which a device interface is provided for detachable connection of the energy storage module to the electric device, with the device interface having electric device supply contacts for the electric energy supply of the electric device. The device interface of the energy storage module has a data interface separate from the device supply contacts, for data communication with the electric device.

23 Claims, 7 Drawing Sheets

(30) Foreign Application Priority Data

Dec. 29, 2017 (DE) .......................... 102017131456.3
Dec. 29, 2017 (DE) .......................... 102017131462.8

(51) Int. Cl.
*G08C 17/00* (2006.01)
*A47L 5/36* (2006.01)
*A47L 7/00* (2006.01)
*H01M 10/42* (2006.01)

(52) U.S. Cl.
CPC ............. *A47L 5/365* (2013.01); *A47L 7/0095* (2013.01); *H01M 10/425* (2013.01); *H01M 2010/4278* (2013.01)

(56) References Cited

FOREIGN PATENT DOCUMENTS

| | | | | | |
|---|---|---|---|---|---|
| CN | 106137039 | A | | 11/2016 | |
| CN | 106214070 | A | | 12/2016 | |
| CN | 107153166 | A | * | 9/2017 | ......... G01R 31/3842 |
| DE | 60303720 | T2 | | 9/2006 | |
| DE | 102010040336 | A1 | | 3/2012 | |
| DE | 102012003073 | A1 | * | 8/2013 | ................ B25F 5/00 |
| DE | 102012003073 | A1 | | 8/2013 | |
| EP | 2628427 | A2 | * | 8/2013 | ........... A47L 7/0095 |
| EP | 2628431 | A2 | | 8/2013 | |
| KR | 20070113445 | A | | 11/2007 | |

* cited by examiner

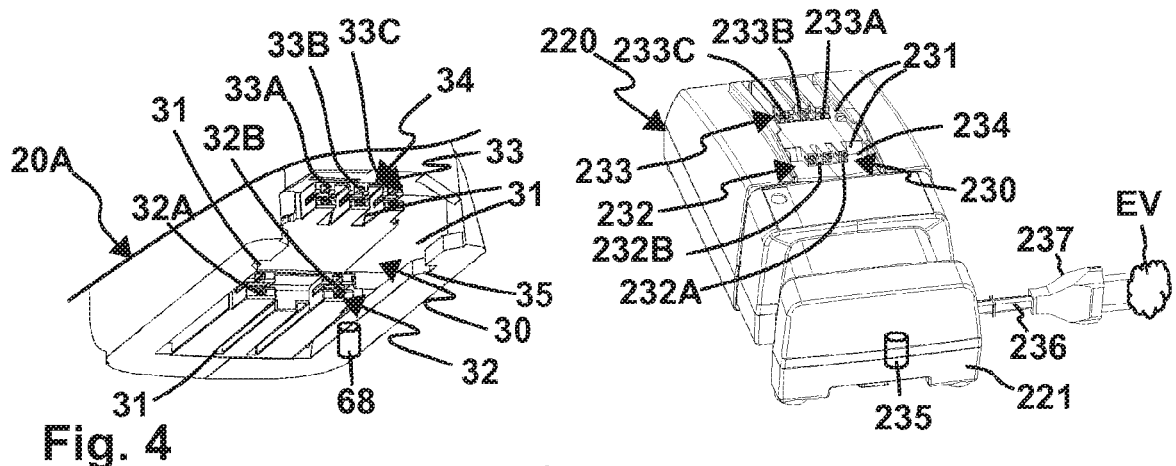
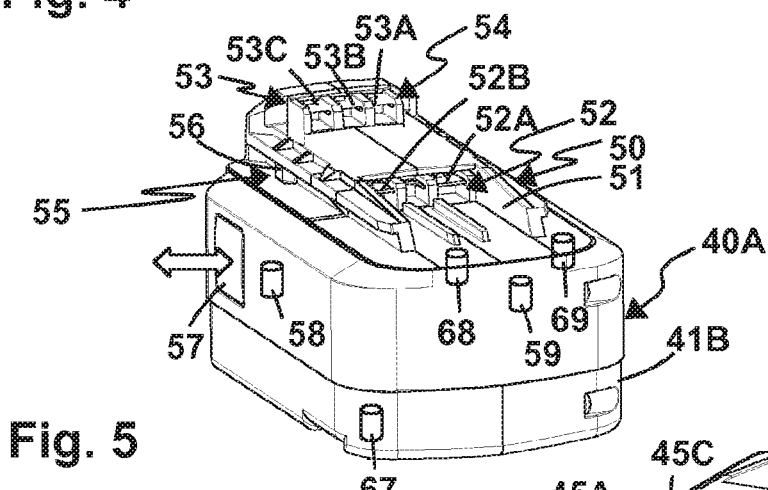
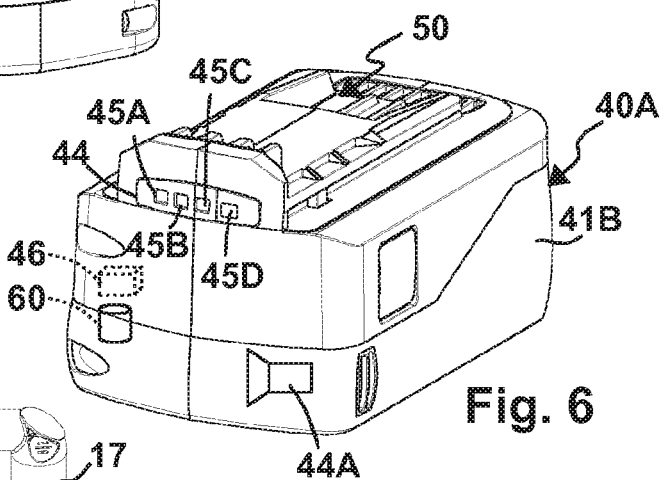
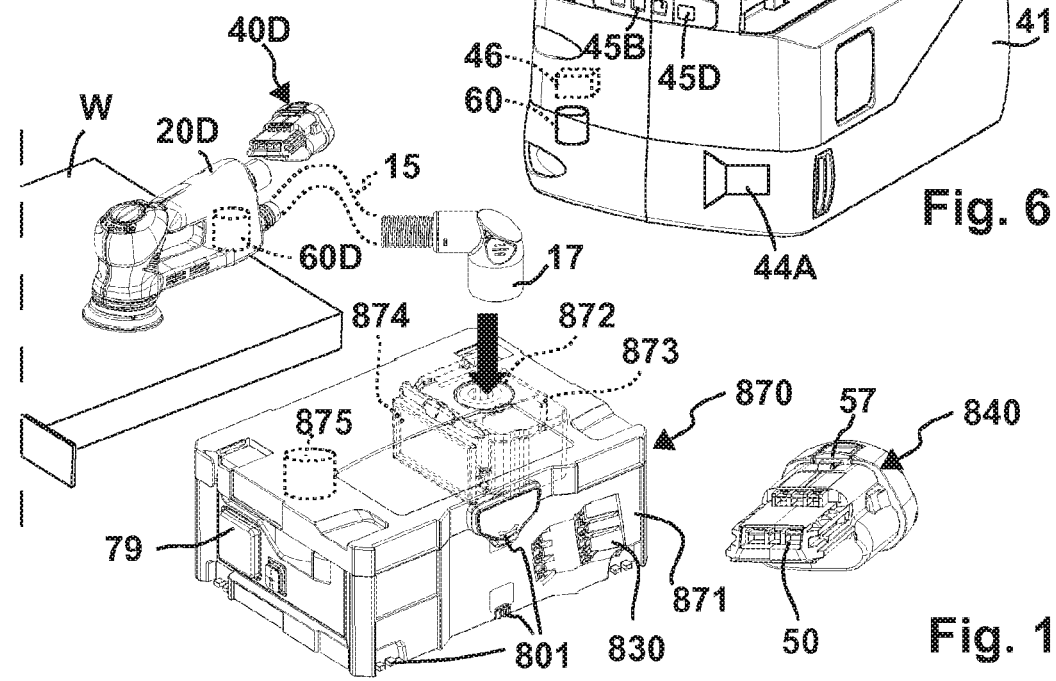

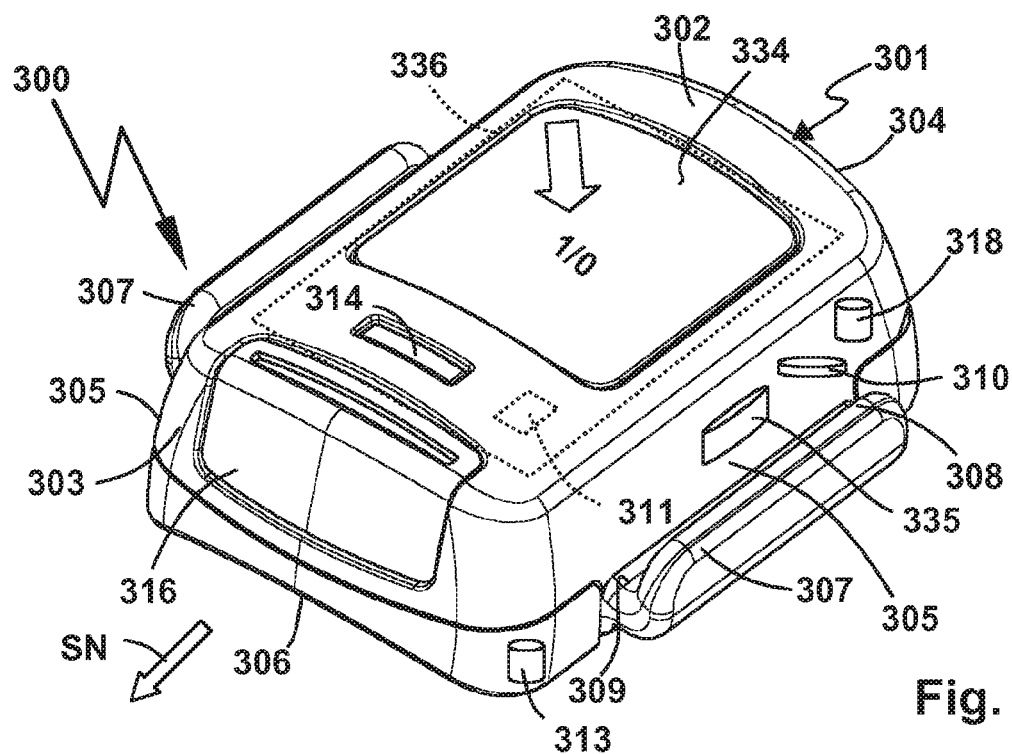
Fig. 8
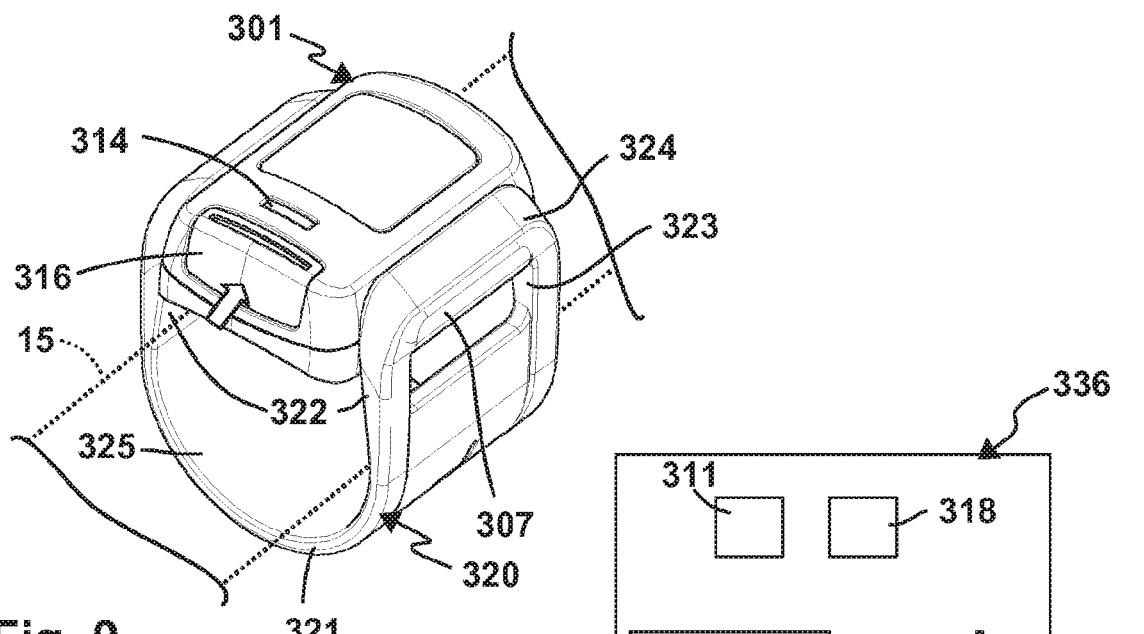
Fig. 9
Fig. 10

ENERGY STORAGE MODULE FOR A HAND-HELD POWER TOOL

This application claims priority based on an International Application filed under the Patent Cooperation Treaty, PCT/EP2018/065098, filed Jun. 7, 2018, which claims priority to DE102017112705.4 filed Jun. 8, 2017, DE102017112707.0 filed Jun. 8, 2017, DE102017131456.3 filed Dec. 29, 2017, and DE102017131462.8 filed Dec. 29, 2017.

BACKGROUND OF THE INVENTION

The invention relates to an energy storage module for use with an electric device in the shape of an electric hand-held machine tool or a vacuum cleaner, with the energy storage module having a wireless communication interface for wireless communication with an external communication apparatus arranged remote from the energy storage module, in particular a vacuum cleaner and a module housing in which an electric storage device, in particular a storage cell arrangement with at least one electrically rechargeable storage cell is arranged and on which a device interface is provided for detachable connection of the energy storage module to the electric device, with the device interface having electric device supply contacts for the electric energy supply of the electric device.

Such energy storage modules are for example required to supply power to hand-held machine tools, for example sawing machines, screw devices or the like. Suction devices, in particular mobile suction devices are increasingly supplied with power using energy storage modules or battery packs.

An energy storage module of the type mentioned at the beginning emerges for example from DE 10 2012 003 073 A1. Using the energy storage module, a jigsaw can switch on or switch off a vacuum cleaner without a wired connection being necessary. The wireless connection can take place exclusively via the wireless communication interface of the energy storage module. The energy storage module detects for example a current flow through a drive motor of the electric device in the shape of a jigsaw and switches the vacuum cleaner on or off as a function of the current.

However, the field of application of such an energy storage module is limited.

SUMMARY OF THE INVENTION

Therefore, the object of the present invention is to provide an improved energy storage module.

In order to achieve the object, in the case of an energy storage module of the type mentioned at the beginning, provision is made for the device interface of the energy storage module to have a data interface separate from the device supply contacts, in particular a bus interface, for data communication with the electric device, with the energy storage module being designed to send transmission signals via the wireless communication interface to the external communication apparatus as a function of received information obtained via the data interface from the electric device and/or to send transmission information to the electric device as a function of received signals received via the wireless communication interface from the external communication apparatus.

A method for using an energy storage module with an electric device in the shape of an electric hand-held machine tool or a vacuum cleaner, with the energy storage module having a wireless communication interface for wireless communication with an external communication apparatus arranged remote from the energy storage module, in particular a vacuum cleaner and a module housing in which an electric storage device, in particular a storage cell arrangement with at least one electrically rechargeable storage cell is arranged and on which a device interface is provided for detachable connection of the energy storage module to the electric device, with the device interface having electric device supply contacts for the electric energy supply of the electric device, provides for data communication between the energy storage module and the hand-held machine tool via a data interface separate from the supply contacts, in particular a bus interface, with the energy storage module sending transmission signals via the wireless communication interface to the external communication apparatus as a function of received information obtained via the data interface from the electric device and/or sending transmission information to the electric device as a function of received signals received via the wireless communication interface from the external communication apparatus.

It is a basic concept of the present invention that so to speak the energy storage module performs the wireless communication for the combination of energy storage module and electric device. Therefore, the electric device itself does not need to have any corresponding functions, in particular even any wireless communication interface.

Therefore, for example, a controller of the electric machine, in particular its microcontroller can operate without it also having to operate another wireless communication interface. This is so to speak transferred into or to the energy storage module. Thus, for example when delays occur in the wireless communication with a device separate from the electric device, namely via the wireless communication interface. Thus, for example wirelessly transmitted messages may be responded to slower or in a delayed manner. The microcontroller or the controller of the electric device are, however, not afflicted by such waiting times or latencies. The controller can perform, unafflicted by the wireless communication, the functions of the electric device, for example actuation of the drive motor of the electric device, monitoring of the electric device or the like.

At the same time, an advantage emerges in regards to timeliness. Usually, the electric devices in the shape of electric hand-held machine tools or vacuum cleaners are used for a relatively long time. In contrast, energy storage modules are essentially less long lasting. For example, storage cells or the like of energy storage modules wear out after some time, in particular after a predetermined number of charging operations or after a certain service life. Consequently, energy storage modules or battery packs are replaced more frequently than the devices to be supplied with electric energy by the energy storage modules, namely hand-held machine tools, vacuum cleaners or the like. Therefore, the case also occurs more frequently where an energy storage module has to be replaced. In this context, updated wireless communication can then be provided, for example according to a different and/or new standard or improved standard.

An energy storage module can thus for example be readily equipped with a WLAN interface, another energy storage module with a Bluetooth interface. By simply replacing the energy storage modules on the hand-held machine tool or the vacuum cleaner, it or they can communicate via WLAN and via Bluetooth.

However, a variant is also conceivable where the wireless communication interface of the energy storage module has at least two wireless communication standards or wireless communication technologies different from one another, for example WLAN and Bluetooth, WLAN and mobile communication or the like. It is possible that the energy storage module autonomously identifies which of the different communication technologies is currently being used. For example, the energy storage module can analyse wireless signals of the vacuum cleaner or the external communication interface and select one communication technology suitable therefor, for example the first communication standard or the second communication standard. If the energy storage module for example receives Bluetooth signals, it responds or it communicates via Bluetooth with the external communication interface, in particular the suction unit, while the energy storage module, in the case of other communication standards, for example Zigbee, WLAN, mobile communication or the like, selects or actively switches this other communication standard.

Furthermore, a hand-held machine tool can be capable of communication even only wirelessly by attaching an energy storage module according to the invention, for example when the hand-held machine tool cannot perform wireless communication. It is otherwise a preferred configuration that namely the hand-held machine tool does not have its own wireless communication interface.

However, a variant of the invention is also possible, in which both, namely the hand-held machine tool and the energy storage module in each case have a wireless communication interface.

The wireless communication interface of the energy storage module sends and receives for example at a frequency of 2.4 to 2.6 GHz. It is preferred when the wireless communication interface can simultaneously operate a plurality of wireless communication channels, for example three or four wireless communication channels.

The wireless communication interface of the energy storage module is for example a Bluetooth interface, a WLAN interface or the like. In this regard, when a new standard, for example with a higher data transmission rate, other messages or new messages, in particular other or new message types, are used, only the energy storage module has to be replaced or provided with new software to perform the new wireless communication functions. The hand-held machine tool or the suction unit, which are fitted or can be fitted with the energy storage module, remain unchanged.

The energy storage module and the electric device communicate internally with one another via the data interface.

The energy storage module sends e.g. transmission signals, which contain received information received via the data interface from the electric device or are dependent thereon. Thus, for example the electric device can send a switching signal or switching information to the energy storage module via the data interface, which in turn sends a corresponding transmission signal, for example a WLAN message, Bluetooth message or the like via the wireless communication interface.

The data flow even functions in the reverse direction, i.e. from the external communication apparatus via the wireless communication interface of the energy storage module to the electric device. Thus, for example the external communication apparatus can send data or other information to the wireless communication interface, which receives it as a received signal. The energy storage module sends corresponding transmission information to the electric device via the data interface as a function of the received signals. Thus, for example the external communication apparatus can form part of a vacuum cleaner which wirelessly reports its operational readiness.

The wireless communication is preferably radio communication. However, optical communication, for example infra-red or the like should also be understood as wireless communication.

The received information can for example comprise at least one operational information item which displays an operating status or operational readiness of the electric device connected to the energy storage module. Thus, for example, when the electric device is operationally ready, the operational information from the electric device is reported via the data interface to the energy storage module. The operational information is for example switching information. The energy storage module in turn is designed to send transmission information dependent on the operational information, for example a control signal, via the wireless communication interface to switch on or switch off the external communication apparatus, in particular the vacuum cleaner. Furthermore, it is advantageous when the energy storage module is designed to send a registration message to establish a communication connection, for example a control connection with the external communication apparatus. Depending on the operating status or the operational readiness of the electric device to be supplied with electric energy by the energy storage module, for example the hand-held machine tool, the energy storage module thus establishes the communication connection to the external communication apparatus.

The operational information or the operational readiness of the electric device may for example be dependent on whether an electric drive motor and/or a device controller to control the electric device is switched on. Thus, for example when a microcontroller, which controls the functions of the electric device, is active or switched on, it sends corresponding operational information or operational readiness information via the data interface to the energy storage module. It in turn may, depending thereon, for example establish the communication connection to the external communication apparatus. The operational information or the operational readiness of the electric device can, however, also depend on the data interface being activated and/or functionally capable of communication between the energy storage module and the electric device.

Thus, for example when an $I^2C$ bus, which represents the data interface between energy storage module and electric device, is operational or is operationally ready or is already in use, the energy storage module derives the operational readiness of the electric device therefrom. Independently thereof, the energy storage module can in turn for example switch on, switch off the wireless communication interface or the like. Thus, e.g. when the hand-held machine tool switches on a power supply for a bus of the data interface, for example the I2C bus, (high level), the energy storage module so to speak is woken up or the control or the control system of the energy storage module is switched on. This function is used so that the controller or the control system of the energy storage module identifies that the hand-held machine tool is switched on and therefore can switch on and switch off the vacuum cleaner.

The energy storage module can expediently perform the registration at the external communication apparatus as a function of this operational readiness, for example the established bus communication via the data interface with the electric device. Thus, when for example a hand-held machine tool is switched on, it receives the bus communication with the energy storage module. The energy storage module in turn presents the communication connection to the external communication apparatus.

The operational information expediently comprises at least one operational readiness information item, for example a bus message, which is transmitted between the energy storage module and the electric device as part of an initialisation communication when switching on the device controller or the electric drive motor. Thus, when for example a switch, in particular a drive switch, of the electric device is actuated, this leads to the electric device so to speak talking to the energy storage module or starting the bus communication. To this end, for example an initialisation communication must take place, in the case of which the energy storage module and the electric device agree on operating parameters, for example a supply voltage to be delivered, maximum values of voltage and current or the like. Such an initialisation communication can serve such that the energy storage module is in turn registered at the external communication apparatus, for example the suction unit.

Furthermore, it is advantageous when the operational information comprises a request of at least one information item characterising the energy storage module, for example an electric characteristic variable, by the electric device at the energy storage module. Thus, for example the electric device can request at the energy storage module its maximum current or maximum voltage, its typical performance or the like. The characterising information can, however, also for example be a serial number, a type designation or the like, of the energy storage module.

The operational information can also comprise a voltage signal or be formed thereby, with the voltage signal being dependent on a supply voltage provided to the data interface by the energy storage module for the electric device and/or by the electric device for the energy storage module. Thus, for example when the electric device supplies a control system or the like of the energy storage module with supply voltage, the energy storage module can derive therefrom that it should activate the wireless communication interface. However, it is also possible that the operational information comprises a voltage signal which the energy storage module provides for the electric device. Thus, for example the electric device can be supplied with a logic voltage by the energy storage module, with which a device controller of the electric device is supplied with power. Irrespective of whether the electric device requires such a voltage or even possibly requests it, the energy storage module can identify that it is provided to a wireless communication. Thus, for example electric devices can be supplied with the energy storage module which do not need any wireless communication interface or cannot handled it. When for example they generate a voltage signal with a first voltage level, the energy storage module can identify therefrom that a wireless communication is not desired. However, when the voltage signal for example signals the supply of an electric jigsaw or the like, this operational information is suitable for the energy storage module to start up or activate the wireless communication interface.

The operational information can, however, also comprise a clock signal of a bus line of the data interface or be formed thereby. Thus, for example when the data interface comprises a clock line and the clock signal is requested or has a determined clock pulse, this is an indication for the energy storage module that the wireless communication interface should be active or should be operated in a determined operating mode. The at least one received information item can for example comprise a voltage information item characterising the electric device, for example a voltage level or be formed thereby. This received information or operational information deviates for example from voltage information which is provided by a charging device.

When the energy storage module for example supplies an electric device with power, the voltage signal, which serves as operational information or received information, is at a lower level, for example 3.3 volts than in a situation where the energy storage module is for example plugged into a charging device or is coupled to a charging device. A charging device can for example provide voltage information or a voltage signal to the data interface of 5 volts.

Using a typical or characteristic communication, for example an initialisation communication, the energy storage module can also identify whether it communicates with an electric device, which uses or should use the wireless communication interface, for example an electric saw or communicates with a charging device. Thus, for example an electric device, which is supplied with power, will not care for the maximum voltage of the individual storage cells of the energy storage module and will accordingly not request this. A charging device in contrast requests the maximum voltage of the respective storage cells in order to optimise the charging operation accordingly.

Consequently, it is thus advantageous when the energy storage module is designed to activate or deactivate the communication with the external communication apparatus as a function of whether the device connected via the device interface to the energy storage module is a charging device provided for electric charging of the energy storage device or a device to be supplied with electric energy by the energy storage module or whether the device interface is unused. A deactivation can be a complete switch-off of the external communication apparatus. However, it is also possible that the deactivated external communication apparatus continues to remain active for a predetermined communication, for example to load program data for parameterisation or the like. A deactivation can thus for example mean that controlling communication in the sense of receiving and/or sending switching information is not possible, but a wireless communication with at least one other device, for example a configuration module is possible. The configuration module for example sends configuration parameters, programs or the like, which the energy storage module also receives in the case of deactivated communication with the external communication device.

When the device interface is unused, thus an electric device is not connected thereto (no vacuum cleaner, no machine tool or the like), the energy storage module can deactivate the communication with the external communication apparatus.

A preferred concept provides that the energy storage module has an, in particular optical and/or acoustic display device to output at least one communication information item relating to the wireless communication between the energy storage module and the external communication apparatus and/or the data communication with the electric device.

For example, the display device can comprise an LED display or the like. When the energy storage module communicates with the external communication apparatus, the display device can signal the functioning communication or the communication currently ongoing. Furthermore, the display device can for example show a registration process or an authorisation process between the external communication apparatus and the wireless communication interface. Of course, an acoustic output can also be provided, for example a signal tone or the like. Furthermore, it is advantageous for the communication between the electric device and the energy storage module to be displayable using the display device.

It is advantageously provided that the display device is designed in a first operating mode to output at least one electric characteristic variable of the energy storage module, in particular a charging status of the electric energy storage device and in a second operating mode to output the at least one communication information item. The display device can accordingly also signal local information of the energy storage module. Thus, for example a charging status or a capacity display of the electric energy storage device can be displayed in the first operating mode. The communication information can be displayed in the second operating mode. When for example the wireless communication is established with the external communication apparatus, the authorisation or registration takes place, this can be signalled in the second operating mode. In the first operating module, the display device has for example a different colour or information sequence than in the second operating mode.

A preferred concept provides that the transmission signals generated using received information of the electric device comprise at least one switching signal to switch on and/or switch off the external communication apparatus, in particular the vacuum cleaner and/or at least one configuration message to configuration the external communication apparatus, in particular the vacuum cleaner as a function of a variable characterising the electric device. As already mentioned, the received information at the data interface, which comes from the electric device, can be used by the energy storage module to send a switching signal to switch on or switch off the external communication apparatus for example the vacuum cleaner. In this case, this should be understood such that the external communication apparatus remains operationally ready, but for example a suction motor of the vacuum cleaner is switched off or switched on. The at least one configuration message can for example serve to configure a working position for example a suction power, of the external communication apparatus. Such a configuration will be clearer below:

A preferred concept provides that the electric device connected to the energy storage module is provided and designed for cooperation with a vacuum cleaner, with the vacuum cleaner having or forming the external communication apparatus. The external communication apparatus can for example be formed directly by the vacuum cleaner which has a corresponding wireless communication apparatus. However, it is also possible that the external communication apparatus is designed as a module which can be connected to a vacuum cleaner. The vacuum cleaner has for example a module interface, in particular in the manner of DE 10 2012 003 073 A1 mentioned at the beginning.

In particular in relation to the above measures, it is advantageous when the energy storage module is designed to switch, in particular switch off and/or activate or deactivate the vacuum cleaner as a function of whether the device connected via the device interface to the energy storage module is a device suitable for cooperation with the vacuum cleaner and/or requiring the suction function of the vacuum cleaner. Thus, when the device connected to the energy storage module is a charging device, a vacuum cleaner is not required, i.e. in this case for example the wireless communication interface of the energy storage module is inactive. However, when the device supplied by the energy storage module is a jigsaw or is another hand-held machine tool, the suction function is required. The wireless communication interface of the energy storage module is then active.

In the case of the energy storage module, it is advantageously provided that it is designed to send a separation signal informing the external communication apparatus, in particular a switch-off signal, via the wireless communication interface in the case of a separation from the device to be supplied with electric energy and/or in the case of falling short of a predetermined charging status value of the energy storage device. Thus, for example when the energy storage module is separated from the hand-held machine tool or can no longer deliver enough energy to supply the hand-held machine tool, it advantageously sends a switch-off signal via the wireless communication interface. In this case, a vacuum cleaner, which is actuated via the wireless communication interface, no longer has to continue to be operated. The external communication apparatus switches off for example a suction unit of the vacuum cleaner.

An advantageous concept provides that the energy storage module is designed to transmit at least one software module or program module received via the wireless communication interface and/or configuration data via the data interface to the electric device. Thus, for example a software update can be received for the device controller of the electric device via the wireless communication interface of the energy storage module. The configuration data can for example contain operating parameters, in particular maximum speeds, runtimes, mains currents or the like, for the energy storage module and/or the electric device.

Of course, the wireless communication interface can also be provided and/or designed for an update of the energy storage module and/or the wireless communication interface itself.

The energy storage module can also be designed to transmit protocol data received from the electric device via the wireless communication interface, for example to transmit error memory data, log files or the like.

Program modules or software modules and/or protocol data are transmitted preferably encrypted via the wireless communication interface.

The received information preferably comprises at least one status information item, for example error information, switching information of a switch, for example a potentiometer, an on-switch or an off-switch or the like, of the electric device and/or at least one identification information item, for example a serial number of the electric device.

The energy storage module is preferably designed to send at least one received information item via the wireless communication interface as a function of a transition from a separation status to an operating status of the device interface of the energy storage module or vice versa. In the separation status, the device interface is electrically and/or mechanically separated from the electric device, in the operating status it is mechanically and/or electrically connected to the electric device. For example, the energy storage module can obtain, in the case of the transition from the separation status to the operating status, received information via the data interface from the electric device, in particular a switching position of a potentiometer, on-switch or the like and send it via the wireless communication interface. Furthermore, the energy storage module can transmit for example, in the case of the transition from operating status to the separation status, information about the wireless communication interface that it is separated from the electric device.

One or a plurality of predetermined received information items received from the electric device via the data interface, in particular non-security-related and/or non-confidential received information, can readily be sent, in particular unencrypted, as part of a broadcast communication, advertising communication or the like by the energy storage module via its wireless communication interface. Thus, for example a smartphone or another external communication apparatus can receive status information, at least one identification information item or the like of the electric device via the energy storage module.

The energy storage module carries out such a broadcast communication, in particular when it passes from the separation status to the operating status and therefore initially receives the predetermined received information from the machine tool, the vacuum cleaner or the other electric device.

However, it is also possible that the energy storage module, after a predetermined time after the transition from the separation status to the operating status and/or periodically and/or cyclically sends the predetermined received information as part of the broadcast communication.

It is preferred when the electric device, for example the hand-held machine tool sends information via the data interface, which is required for a suitable automatic suctioning. The electric device can thus for example report its type, a dust class, a respective operating position or an operating status of the drive motor (speed or the like), its current power consumption or the like via the data interface to the energy storage module. Furthermore, it is possible that data recorded locally by the electric device, for example a contact pressure, a current dust concentration or the like, are reported by the electric device via the data interface to the energy storage module. The energy storage module can output data received via the data interface to the wireless communication interface such that the external communication apparatus, in particular a vacuum cleaner, can be set for the corresponding functions.

Furthermore, it is possible that the machine also for example sends a switching signal, for example a switch-on signal, switch-off signal or the like, via the data interface to the energy storage module, which in turn outputs corresponding transmission information to the wireless communication interface for the external communication apparatus, for example the vacuum cleaner. Thus, for example, the electric device, when it is a device not suitable for dust suction or not requiring dust suction, in particular a screw device or the like, or when the electric device, owing to other operating parameters, knows or has identified that it does not need dust suction (for example because a dust bag is connected to the electric device), sends a corresponding signal or corresponding transmission information via the data interface to the energy storage module, which in turn outputs this data preferably to the wireless communication interface for the external communication apparatus.

It is preferably provided that the energy storage module has a module housing and an energy storage device received in the module housing, in particular an arrangement with at least one rechargeable electric storage cell to provide electric energy for the energy supply of the machine tool or the supply contacts provided for the vacuum cleaner. The electric storage cells, in particular a grouping or an arrangement of a plurality of electric storage cells are for example chargeable by a charging device. However, it is also possible that the energy storage device has for example a fuel cell or the similar other electric storage device or chemical storage device which can provide electric energy at the end.

The energy storage module expediently has a module housing with a device interface for the detachable connection to the machine tool. The device interfaces of the energy storage module to the machine tool or the vacuum cleaner have supply contacts compatible with one another to transfer electric energy and/or data contacts, in particular bus contacts to transmit data.

The machine tool is a machine tool generating dust and/or particles, for example a sawing machine, a drilling machine, a milling machine, a grinding machine or the like. In particular, the machine tool is a hand-held machine tool. The machine tool expediently has a suction outlet, for example a connection fitting to connect a suction hose.

The vacuum cleaner could also be generally designated as a vacuum device. The vacuum cleaner can itself of course not only vacuum dust, but rather also coarser particles which the machine tool generates.

It is preferred for the control connection to only be establishable or established when the vacuum cleaner and the machine tool are flow-connected to one another using the suction hose or a suction hose.

Sensors or detection means can be provided on the machine tool and/or the vacuum cleaner which identify the connection of the suction hose. Only if a suction hose is actually connected, will the control connection be established.

BRIEF DESCRIPTION OF THE DRAWINGS

Embodiments of the invention are explained below using the drawing. These show.

DETAILED DESCRIPTION

Figure 1:
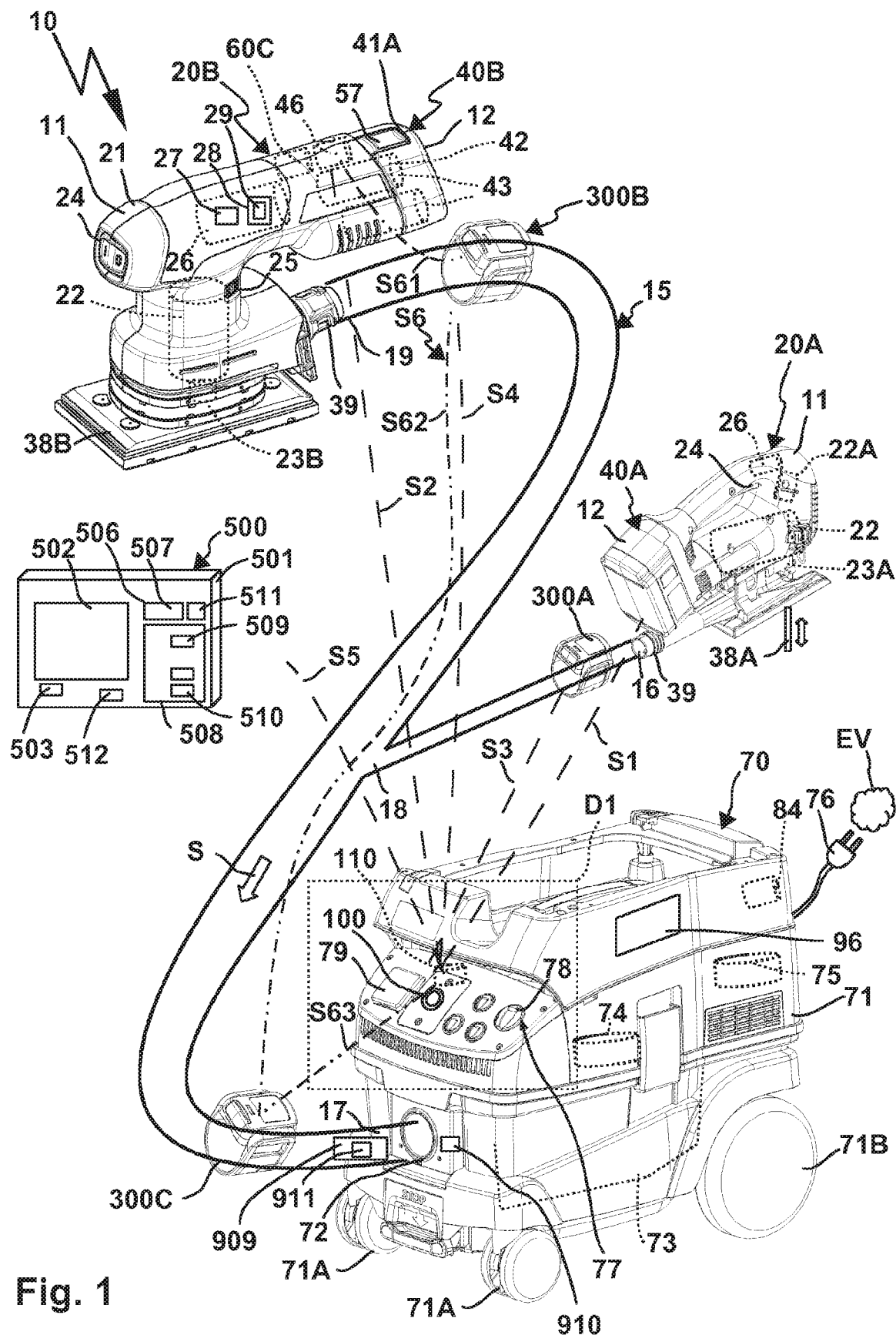
FIG. 1 a perspective oblique view of a system according to the invention comprising a hand-held machine tool and a vacuum cleaner, FIG. 2 a partial view roughly corresponding to a detail D1 of the vacuum cleaner according to FIG. 1, FIG. 3 a perspective oblique view of a communication module of the vacuum cleaner according to FIG. 1, FIG. 4 a device interface of a machine tool according to FIG. 1, FIG. 5 an energy storage module of the system according to FIG. 1 represented in a perspective oblique manner, FIG. 6 the energy storage module according to FIG. 5 represented perspectively from another side, FIG. 7 a charging device to charge the energy storage module according to FIGS. 5, 6, FIG. 8 a communication module of the system according to FIG. 1 in a perspective oblique view, FIG. 9 the communication module according to FIG. 8, but with a fastening device for fastening on a schematically represented suction hose, FIG. 10 a schematic functional representation of the communication module according to FIG. 9, 10, FIG. 11 a schematic circuit diagram of the energy storage module and a hand-held machine tool and a communication module according to FIG. 1, FIG. 12 a schematic circuit diagram of the energy storage module according to FIG. 4 in cooperation with the charging device according to FIG. 7, FIG. 13 a perspective representation of the other energy storage module according to FIG. 1 in the status put on the charging device according to FIG. 7, FIG. 14 a communication diagram between the vacuum cleaner according to FIG. 1 and an energy storage module, FIG. 15 a schematically represented system with a vacuum cleaner arranged in a transport box and operable with an energy storage device, FIG. 16 a diagram with a relation between signal strength information and a response time.
Figure 2:
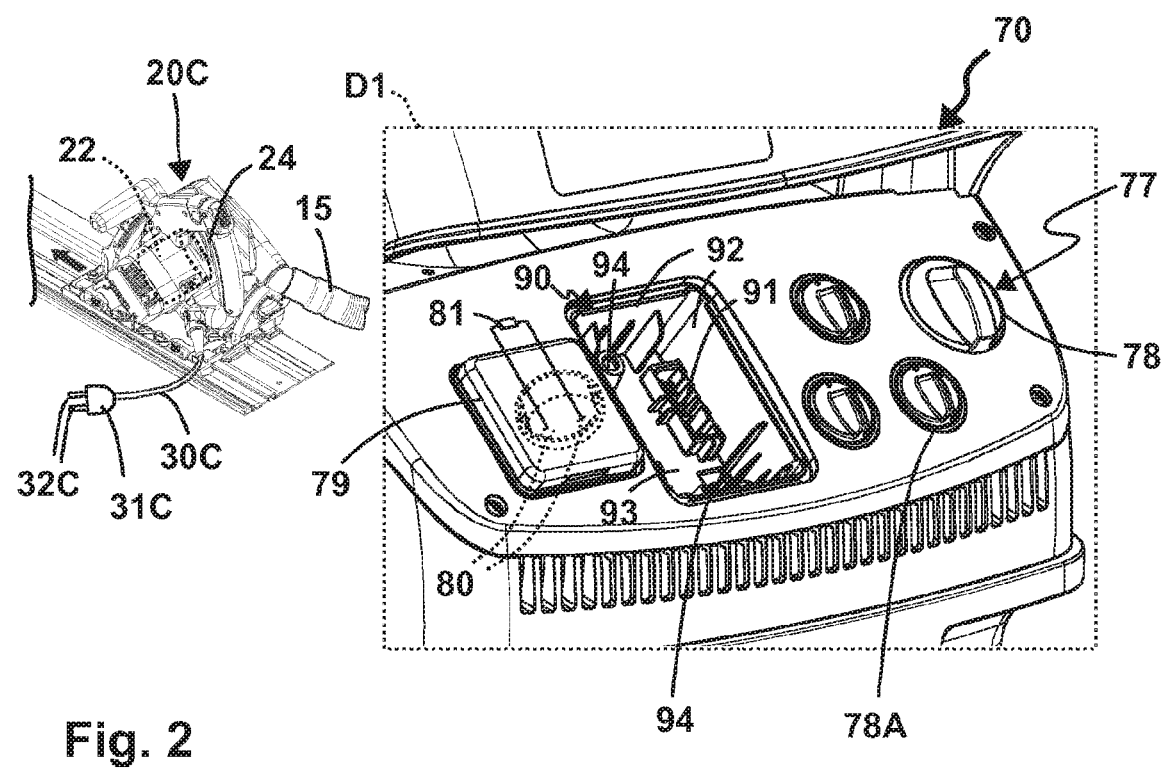
Figure 3:
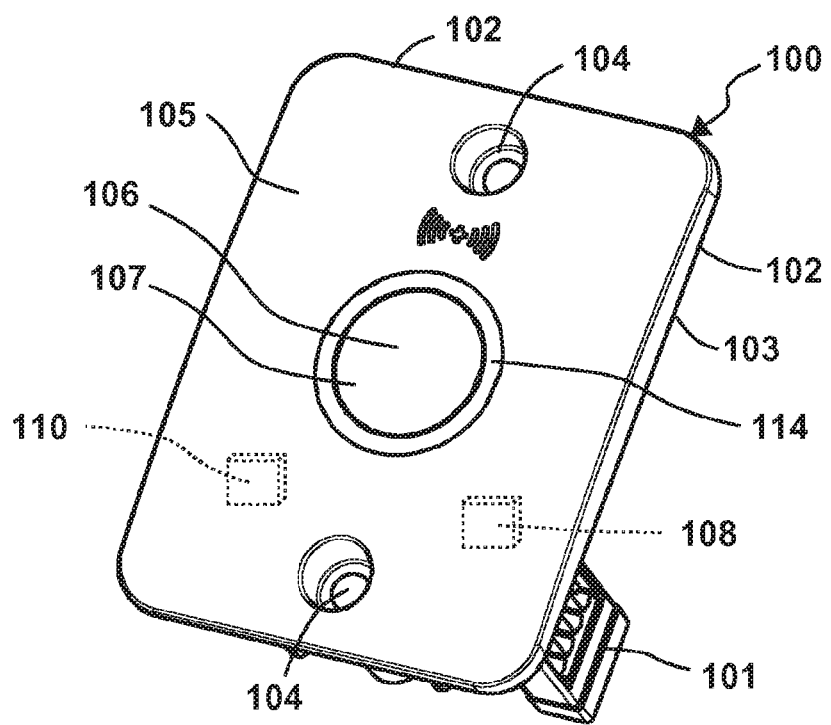
Figure 11:
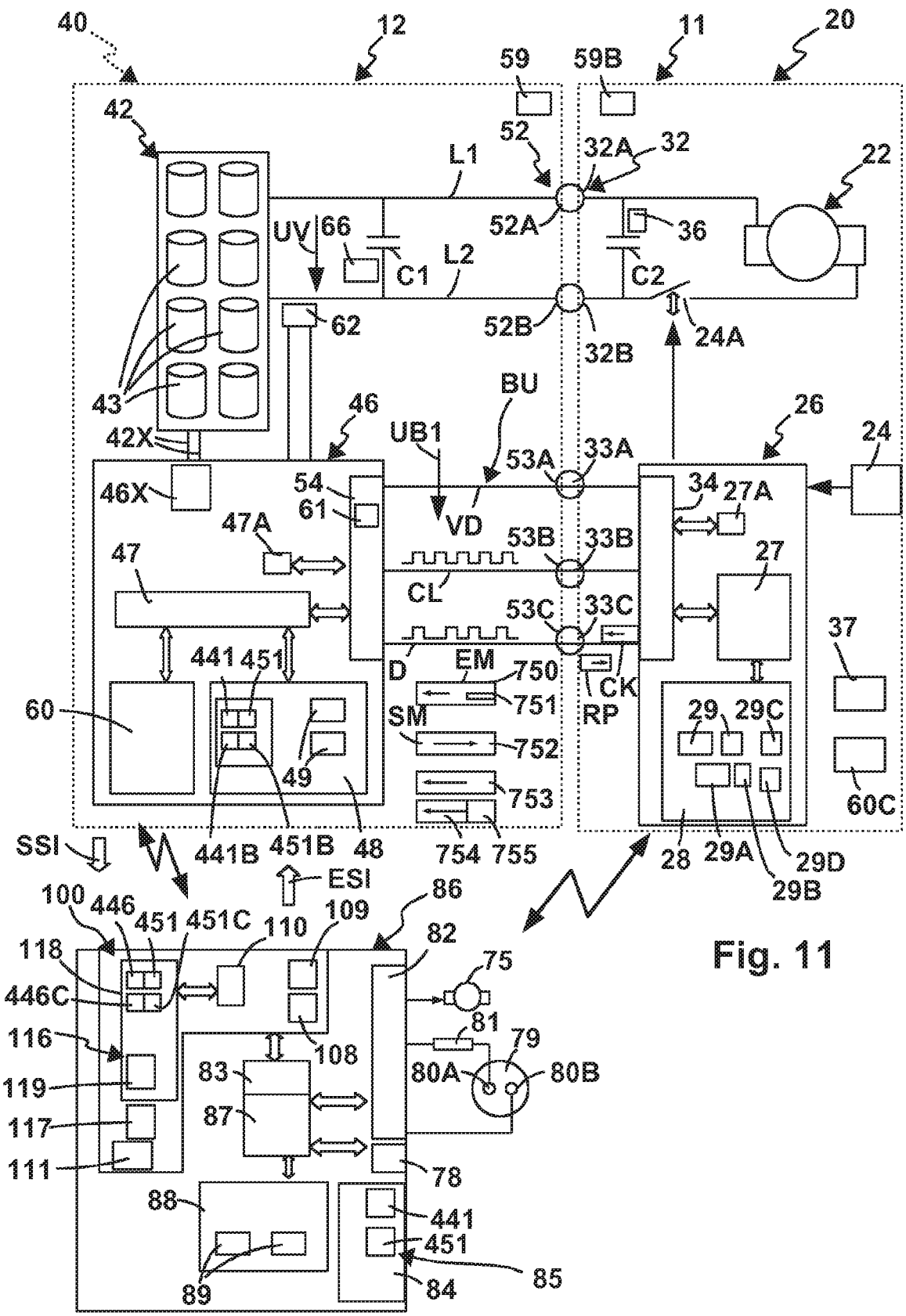

Identical and similar components are provided below in part with the same or similar reference numerals marked with the addition of A, B etc.

A system 10 partially schematically represented in FIG. 1 comprises machine tools 20A, 20B which are supplied with electric energy by energy storage modules 40A, 40B. The machine tools 20A, 20B are machine tools generating dust or participles and in particular hand-held machine tools. The machine tool 20B is for example a grinding device, the machine tool 20A is a saw, in particular a jigsaw, with a router or similar other electric machine tool or hand-held machine tool generating dust or particles also being readily possible.

A drive motor 22 is arranged in a machine housing 21A, 21B of the machine tool 20A, 20B which is provided to drive a tool holder 23A, 23B and therefore a tool 38A, 38B arranged on the tool holder 23A, 23B. The tool 38A is for example a sawing tool, the tool 38B is a grinding pad. The drive motor 22 can drive the tool 238A, 38B directly or via a gear, e.g. a gear 22A for an oscillating movement.

The machine tool 20A, 20B can be switched on and switched off using a switching element 24, for example an on-switch/off-switch. A further switching element 25 is for example designed as a speed regulator or speed controller. An embodiment is possible in the case of which for example the speed of the drive motor 22 is modifiable by a corresponding actuation stroke of the switching element 24.

The hand-held machine tool 20A, 20B has a control device 26 to actuate the drive motor 22. The control device 26 for example comprises a processor 27 and a memory 28. A program module or a plurality of program modules 29 are stored in the storage device 27, whose program code is executable by the processor 27 in order to control the hand-held machine tool 20A, 20B and/or to communicate with the energy storage modules 40A, 40B.

The machine tool 20A, 20B has a suction connection or suction outlet 39 to connect a suction hose 15 via which dust occurring during the operation of the tool 38A, 38B can be suctioned. The suction outlet 39, for example a connection fitting, communicates with suction openings arranged on or in the tool 38B, which are not visible in the drawing. Therefore, dust can be suctioned directly away from the tool 38A, 38B in a normal manner known per se.

A vacuum cleaner 70 of the system 10 has a vacuum housing 71 which can be put and/or is rollable for example on rollers 71A, 71B on a floor. The vacuum device 70 is a mobile vacuum device. The vacuum cleaner 70 could, however, also have the shape of a stackable vacuum cleaner, consequently a stack housing and/or have a box shape. The rollers 71A, 71B are optional.

The vacuum cleaner 70 has on the front side of the vacuum cleaner housing 71 a suction inlet 72 to which the suction hose 15 is connectable. The suction hose 15 extends with a longitudinal end 16, which is connected to the suction outlet 39A, and another longitudinal end 17, which is connected to the suction inlet 72, between the machine tool 20A and the vacuum cleaner 70. The machine tool 20B is connected via a branch 18 of the suction hose 15 to the vacuum cleaner 70. The branch 18 branches to the longitudinal end 16 and to a longitudinal end 19 which is connected to the suction outlet 39A of the machine tool 20B. Of course, the branch 18 of the suction hose 15 is optional. A suction hose can also be provided in a manner known per se which extends directly between a suction outlet 39 and the suction inlet 72, without having a branch.

A dirt collection chamber 73 is provided in the vacuum housing 71 in which dust and other particles can be received from a vacuum flow S, which is suctioned via the suction outlet 72. A filter 74 is preferably provided above the dirt collection chamber 73. However, a filter sack can also be arranged in the dirt collection chamber 73 in addition to or instead of the filter 74 which is suitable for collecting dirt and particles. The already mentioned vacuum flow S, which is suctioned through the suction inlet 72, can be generated by a suction unit 75. The suction unit 75 is for example supplied with electric power using a mains connection device 76. The mains connection device 76 for example comprises a connection cable and a connection plug to connect to an electric supply network EV, in particular with 220 V or 110 V alternating current.

The functions of the vacuum cleaner 70 are controllable by an operating element arrangement 77. The operating element arrangement comprises for example a switching element 78, by means of which the vacuum cleaner can be switched on or switched off or switched into automatic operation, in the case of which for example a current guided via an outlet 79 leads to the suction unit 75 switching on and switching off. The outlet 79 is expediently provided on the operating element arrangement 77. An electric consumer, preferably an electric hand-held machine tool 20C can be connected in the outlet 79.

The outlet 79 has contacts 80, in particular bushes into which contacts 32C of a plug 31C of the hand-held machine tool 20C are insertable. The plug 31C is arranged on a connection cable which is a part of a mains connection device 30C. If an operator actuates a switching element 24 of the hand-held machine tool 20C to power its drive motor 22, with which for example a saw blade is drivable, current flows via the mains connection device 30C, which is provided by the vacuum cleaner 70 via the outlet 79. This current is detectable by a current sensor 81 in a manner known per se. A control device 86 of the vacuum cleaner 70 switches on the suction unit 75 in the case of a current flow via the outlet 79 in a manner known per se and at the end of the operation of the hand-held machine tool 20C, i.e. when the current sensor 81 no longer determines a current flow, switches off the suction unit 25, expediently with a stopping time.

The current sensor 82 is for example connected to an input/output interface 82 of the control device 80. The input/output interface 82, for example a power electronics interface further serves to actuate the suction unit 75.

The control device 86 further has a processor 87 and a memory 88 in which one or a plurality of program modules 89 are stored. The at least one program module 89 has a program code which is executable by the processor 87 and, amongst other things, enables one or a plurality of the following functions.

The outlet 79 is connectable via the vacuum cleaner 70 to the supply network EV or also connectable directly to the supply network EV, namely using the mains connection device 30C.

The machine tools 20A, 20C in contrast are equipped for a cableless or wireless operation. They can namely be supplied with electric power using the energy storage modules 40A, 40B.

The energy storage modules 40A, 40B are constructed functionally similarly, with mechanical differences and/or electric differences possibly readily existing with regards to the power supply capacity, voltage or the like.

The energy storage modules 40A, 40B have module housings 41A, 41B in which energy storage devices 42 are arranged. The energy storage devices 42 have one or a plurality of storage cells 43, in particular a storage cell arrangement with a plurality of storage cells 43 which are rechargeable.

Using a display device 44, which is optionally present in the case of the energy storage module 40A, a charge status of the energy storage device 42 can be output, for example acoustically and/or optically. The display device 44 for example comprises a speaker 44A, which can signal a low charge status, e.g. using a warning tone. In the case of the display device 44, an arrangement of one or a plurality of lights 45 is preferred, for example lights 45A, 45B, 45C and 45D. The lights 45A-45D are preferably LEDs.

The functions of the energy storage modules 40A, 40B are controllable by control devices 46.

The control devices 46 can be supplied with electric energy directly by the energy storage device 42 and/or one or a plurality of the storage cells 43. For example, supply lines 42X can be provided between the energy storage device 42 and the control device 46. A control device 46 can also have a supply module 46X to adapt a voltage provided by the energy storage device 42 or a supply current provided by the energy storage device 42. Therefore, a respective control device 46 can be supplied with electric energy locally, irrespective of whether the energy storage module 40 is connected to an electric device, for example a charging device or a machine tool or a vacuum cleaner.

The control devices 46 for example have a processor 47 and a memory 48 in which at least one program module 49 is stored. For example, the control device 46 can communicate with the control device 26 of the hand-held machine tool 20A, 20B. The processor 47 can execute program code of the program modules 49, amongst other things to implement the functions explained in detail below.

The energy storage modules 40A, 40B are detachably connectable to one another with the machine tools 20A, 20B using device interfaces 30 of the machine tools 20A, 20B and device interfaces 50 of the energy storage modules 40A, 40B.

The machine tools 20A, 20B form first system components 11, the energy storage modules 40A, 40B second system components 12, which are fixedly connected to one another such that they in each case form a system.

The device interfaces 30, 50 comprise, to this end, contours fitting together in a positive-locking manner, for example to form positive-locking contours suitable for rotary locking or as in the present case plug positive-locking contours 51 on the device interface 50, which can engage the device interfaces 30 in a positive-locking manner with plug counter positive-locking contours 31, namely in the context of a plug movement.

Using this plug movement, device supply contacts 32 of the device interface 30 enter into contact with supply contacts 52 of the device interface 50 such that electric energy from the energy storage device 42 can be provided via the supply contacts 52, 32 for the respective machine tool 20A, 20B, in particular its drive motor 22.

The device interfaces 30, 50 further comprise data contacts 33, 53 of data interfaces 34, 54 such that even data communication, in the present case in particular a bus communication between the system components 11, 12, is possible.

A fixing device 55 provides additional hold for the positive-locking design using the plug positive-locking contours 51, 31 by means of which the system components 11, 12 are fixable to one another. The fixing device 55 for example comprises a fixing element 56, in particular a catch, a latching element or the like which can be engaged with a fixing contour 35. The fixing contour 35 and the fixing element 56 are arranged on the first system components 11 and the second system components 12, with the reverse configuration also being readily possible. The fixing device 55 forms, in the present case, a locking device and/or catch device. The fixing element 56 can, using an actuation element 57, be disengaged, optionally also engaged, with the fixing contour 35. For example the fixing element 56 is a fixing projection/locking projection, which can be engaged with the fixing contour 35 designed as a fixing holder or depression. If the fixing device 55 engages its fixing position or locking position, the plug positive-locking contours 51 remain engaged with the plug counter positive-locking contours 31, i.e. a relative movement of the system components 11, 12 along the plug axis of the plug positive-locking contours 51, 31 is not possible.

The actuation element 57 and/or the fixing element 56 are spring-loaded by a spring arrangement (not visible) into the fixing position or locking position. Therefore, the fixing device 55 can be moved out of the fixing position into the detached position by simple pressure actuation or button actuation of the actuation element 57. In each case, one fixing element 56 is preferably provided on the energy storage module 40A on sides opposed to one another, also in each case one actuation element 57 is necessary, while in the case of the energy storage module 40B only a single push button or a single actuation element 57 is necessary.

The energy storage modules 40A, 40B can be charged using a charging device 220. The charging device 220 has a charging device housing 221 on which a device interface 230 is provided. The device interface 230 has plug counter positive-locking contours 231 which are compatible in a positive-locking manner with the plug positive-locking contours 51 of the energy storage modules 40A, 40B. Locking is not necessary for stationary operation. Fitting the device interface 50, the charging device 220 further has device supply contacts 232 and data contacts 233 of a data interface 234, preferably a bus interface. A voltage transformer 235 is preferably arranged in the charging device 220, which can be supplied with electric power using a mains connection device 236 and provide a direct voltage at the device supply contacts 232 to charge the energy storage device 42. The connection plug 237 forms a part of a mains connection device 236 and can be arranged directly on the charging device housing 221 or be connected via a line, which is schematically represented, to the charging device housing 221. The connection plug 237 is connectable to the supply network EV.

The data interfaces 34, 54 and 234 are bus interfaces in the present case. For example, the bus interfaces or data interfaces 34, 54, 234 are $I^2C$ bus interfaces. The bus interfaces comprise a clock line CL, a data line D and a supply line VD, to which data contacts 33A, 53A and 234A are assigned, a clock line CL, to which data contacts 33B, 53B and 233B are assigned, and a data line D, to which data contacts 33C, 53C, 234C are assigned. The supply line VD is used so that the device interface 30 or 230 of the device interface 50 provides an electric supply voltage, for example a bus voltage UB. A bus clock of the bus BU implemented on the data interfaces 34, 54, 234 is provided via the clock line CL. Data is transferred via the data line D, preferably bidirectionally from the energy storage module 40 to the machine tool 20 and vice versa and/or from the energy storage module 40 to the charging device 220 and vice versa.

If the system components 11, 12 are connected to one another, the energy storage module 40 provides a supply voltage UV to the supply contacts 52A, 52B which is suitable for operating the drive motor 22. The supply voltage UV is for example a direct voltage of 15 volts or 18 volts, but can also be another voltage at any time. It should be mentioned at this point that an energy supply module could of course also provide an alternating voltage. This is not essential. The control device 26 of the machine tool 20A, 20B, simply designated below as the machine tool 20, actuates, as a function of an actuation of the switching element 24, the drive motor 22, with it opening or closing for example a switch 24A. Instead of the switch 24A, a power electronics, for example an energisation device can also be provided for an electronically commuted drive motor 22. Furthermore, it is conceivable for the switching element 24 to be switched directly into the current circuit of the drive motor 22 and therefore to be able to switch it on and off. If the switch 24A is closed, the current flows from the energy storage device 42 via a line L1 to the drive motor 22 and from said drive motor back via a line L2 to the energy storage device 42.

Figure 12:
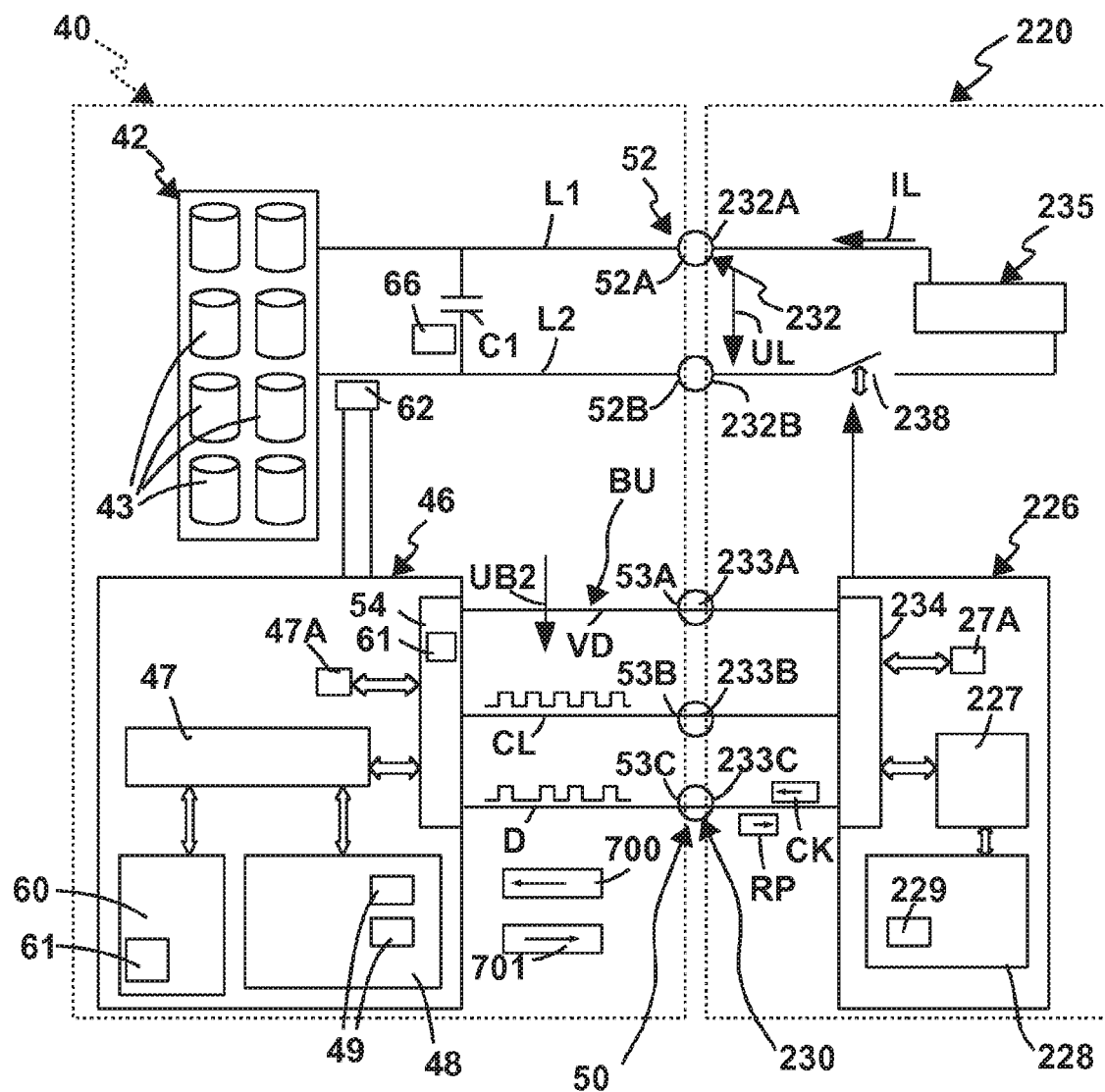
Figure 13:
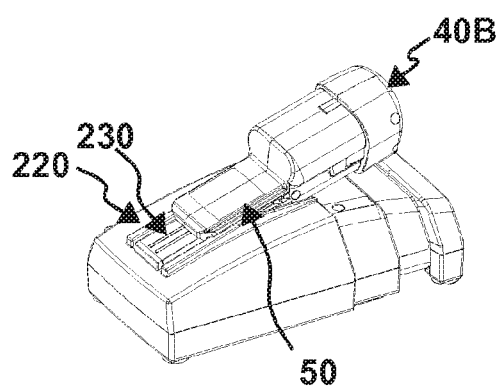

In the case of a charging operation, this current flow design is precisely the reverse, which is clear from FIG. 12. A charging current IL flows in this case from the voltage transformer 235 via the line L1 to the energy storage device 42. The supply contact 232B is, just like the supply contact 52, assigned to a line L2, for example to an earth line. The charging operation is preferably controlled by a control device 226 of the charging device 220. The control device 226 can for example actuate the switch 238 in order to begin or end the charging operation. In order to monitor the charging operation, the charging device 220 also communicates with the energy storage module 40, namely via the data interface 234 and the data contacts 233A, 233B and 233C assigned thereto for the supply line VD, the clock line CL and the data line D. The charge status of the energy storage device 42, its nominal voltage or the like can for example be requested by corresponding communication on the bus BU between the charging device 220 and the energy storage module 40. In order to control and monitor the charging operation, the charging device 234 has for example a processor 27 which can execute control commands or program code of a program module 229 to control the charging operation. The processor 227 is connected to a memory 228 of the control device 226 of the charging device 220 in which the program module 229 is stored.

The vacuum cleaner 70 is actuatable in a wireless or cableless manner. To this end, the vacuum cleaner 70 has an integral external communication apparatus 100 or an external communication apparatus 100 preferably designed as a module. The external communication apparatus 100 is detachably arrangeable in a module holder 90 of the vacuum cleaner housing 71. The module holder 90 is for example arranged in the region of the operating element arrangement 77, in particular a front wall 95 on which the operating element arrangement 77 is provided. When the communication module in the shape of the external communication apparatus 100 is inserted into the module holder 90, contacts of contact arrangements 90, 101 of the module holder 90 and the communication apparatus 100 enter into contact with one another. Therefore, data, information, electric supply voltage and the like can be transmitted. For example, the control device 86 supplies the external communication apparatus 100 with the electric supply voltage via the contact arrangement.

Furthermore, a data interface 83 of the control device 86 and a data interface 108 of the external communication apparatus 100 are in contact with one another using the contact arrangements 101 and 91. The data interfaces 83, 108 for example comprise a bus interface, via which the external communication apparatus 100 and the control device 86 can communicate data and information.

The data interfaces 108, 83 for example implement a bus connection, in particular an I$^2$C bus connection. Other bus communications are also possible. Furthermore, the data interfaces 83, 108 can also comprise individual data contacts, for example for a parallel data transmission.

The module holder 90 comprises side walls 92 which extend from a bottom 93 of the module holder 90 to the front wall 50. In the module holder 90, i.e. in the internal space between the side walls 92 and the bottom 93, the contact arrangement 101 protruding from a rear side 103 of a front wall 105 of the external communication apparatus 100 can engage into the contact arrangement 91 arranged on the bottom 93 of the module holder 90 or enter into contact therewith. Side wall surfaces 101 of the front wall 105 are then aligned with the side walls 92 such that a forward side or the front wall 105 of the external communication apparatus 100, as represented in FIG. 1, is aligned with the front wall 95. The plug connection of the module of the external communication apparatus 100 in the module holder 90 alone ensures a reliable hold. A fixing device for example a catch device, clamp device or the like not represented in the drawing is preferably provided for further fixing. In the present case, a screw connection is provided. For example, one or two screw holders 94 are provided on the module holder 90 which align with screw holders 104 of the external communication apparatus 100 when this is received in the module holder 90. Screws indicated in FIG. 1 can be screwed into the screw holders 104, 94.

The vacuum cleaner 70 can be actuated in a wireless and/or cableless manner using the external communication apparatus 100, for example by a wireless communication interface 60 of the energy storage module 40A or 40B.

It should be mentioned at this point that the wireless communication interface 60 is to be provided by way of example for a wireless actuation of the systems comprising the system components 11 and 12, namely in each case an energy storage module and a machine tool. Thus, the machine tool 20C can for example be equipped with a wireless communication interface 60C in order to directly perform one or a plurality of communication functions still to be described below, i.e. without a respective energy storage module 40, which a wireless communication interface, communicating wirelessly with the vacuum cleaner 70.

The external communication apparatus 100 can be switched, using a registration operating element 160, into a standby mode from an operating mode in which a control connection with the external communication apparatus 100 can be newly established or re-established.

The standby mode or the operating mode are optically and/or acoustically signalled by the external communication apparatus 100. For example, a display device 114 is provided which can signal different operating modes of the external communication device 100. The display device 114 for example comprises a light display, in particular a circular light display. The display device 114 is for example arranged around or on the registration operating element 106. The registration operating element 106 is for example a button 107 around which the display device 114 preferably circularly extends.

When the display device 114 permanently illuminates, it signals an established control connection, i.e. the status "connected". When the external communication apparatus 100 is switched, using the registration operating element 106, from the operating mode into the standby mode, the display device 114 illuminates for example in another colour or with another movement pattern, in particular with a slow, circulating movement pattern. This movement pattern or the colour of the display device 114 can be independent on the type of control connection. When a control connection, as explained below, is a control connection to be currently established and/or a temporary control connection already established, the display device 114 can for example have a slow circulating light display. When, however, a control connection is permanently established or to be established, i.e. the standby mode is suitable for establishing a permanent control connection, the display device 114 illuminates differently. For example, the circular illumination of the display device 114 then takes place at a higher frequency.

For a permanent control connection, a e.g. communication module 300 is provided, which preferably forms a system component of the vacuum cleaner 70, is connected to the external communication apparatus 100.

The communication module 300 is a communication module arranged or arrangeable outside of the vacuum housing 71. The communication module 100 serves to maintain and/or establish a control connection of the electric device in the shape of the system components 11 and/or 12 with the vacuum cleaner 70, in particular the external communication apparatus 100.

The communication module 300 has a module housing 301 which can be placed on the suction hose 15. The module housing 301 expediently has on its upper side 302 a switching element 334 with which the suction unit 75 can be switched on and/or off. The switching element 334 takes up the majority of the upper side 302 in an ergonomically favourable manner such that it is easy to operate or actuate. The switching element 334 is for example a push button, rocker switch or the like.

The module housing 301 has a shape adapted to the suction hose 15. For example, an underside wall 306, which, in the status of the communication module 300 installed on the suction hose 15, comes to rest on its outer circumference, has a round contour adapted to the round outer circumference of the suction hose 15. A forward side wall 303, a rear side wall 304 and longitudinal side walls 305 extend between the underside wall 306 and the upper side or upper side wall 302. They delimit an internal space in which a control device 336 of the communication module 300 is arranged in a supported manner.

The control device 336 for example has a processor 337, a memory 338 and at least one program module 339 which comprises program code which can be executed by the processor 337 to perform the functions of the communication module 330, which will be explained later.

In order to install the communication module 300 on the suction hose 15, hooks 301 are provided on the longitudinal side walls 305. Consequently, the module housing 301 thus has in each case one hook 307 at sides opposed to one another. Each hook 307 has a hook projection 308 and a hook depression 309. The hooks 307 serve to fasten a hose bracket 320 (FIG. 8) for example of a clamping point 321. The hose bracket 320 has on its longitudinal end regions 322 in each case hook holders 323 which can be engaged with the hooks 307. Of course, other fastening technologies are also possible, for example by means of an adhesive strip or the like. Integration of a communication module 300 on the longitudinal ends 16 and/or 17 of the suction hose 15 may also be conceivable, for example when corresponding tubular bodies are provided, e.g. connection pieces or connection fittings made from rubber, plastic or the like. The communication module 300 can, however, also be adhered, welded on the suction hose 15 or similarly otherwise connected to the suction hose 15. However, this is irrelevant for the communication functions of the communication module 300. The ergonomically favourable arrangement on the suction hose 15 is also advantageous.

To switch the external communication apparatus 100 from the operating mode to the standby mode, a registration operating element 316 is provided. The registration operating element 316 for example comprises a button 317. The functions of the registration operating element 316 correspond to those of the registration operating element 106 such that the operator so to speak finds the same operating design.

Accordingly, a display device 314 is also designed identically or similar to the display device 114. The display device 314 for example comprises a light display which signals information in relation to the establishment and/or presence of a control connection between the communication module 300 and the external communication apparatus 100.

When an operator for example actuates the registration operating element 316, in particular pushes the button 317, a communication interface 311, in particular a Bluetooth interface, a WLAN interface or the like sends a corresponding control signal, in particular a switching message SN to the communication interface 110 to switch to the standby mode. As a result, the external communication apparatus 110 is switched to a standby mode which the display device 314 signals. An actuation of the registration operating element 316 leads to the external communication apparatus 100 switching from the operating mode to the standby mode. In order to send the control signal, an encrypted and/or authenticated connection is preferably provided between the communication module 300 and the external communication interface 110.

When the switching element 334 is actuated, the communication module 300 sends a start command or switch-on command for the suction unit 75 to the external communication apparatus 100 and consequently to the control device 86 of the vacuum cleaner 70. Using a switching element 335, for example a rotary element, a sliding element or the like, the communication module 300 can send a control command to the external communication device 100 and therefore to the vacuum cleaner 70, with which for example the speed of the suction unit 75 and/or its power can be adjusted. Consequently, the communication module 300 can serve as a remote control for the suction unit 75. A secured and/or encrypted control connection between the communication module 300 and the external communication apparatus 100 is also advantageous for the remote control functions.

Since the communication module 300 forms a system component of the vacuum cleaner 70, a control connection from the communication module 300 to the external communication apparatus 100 is a so to speak permanent control connection. Such a control connection requires a higher degree of difficulty to establish it than a control connection between a system component 11 or 12 and the vacuum cleaner 70. Accordingly, for example the registration operating element 106 and/or 316 must be actuated for longer in order to authorise or register the communication module 300 at the vacuum cleaner 70 or the external communication apparatus 100. A registration procedure to establish a control connection between one of the system components 11 or 12 for example the energy storage module 40 and the external communication apparatus 100 is, in contrast, easier to establish, for example using a shorter actuation of the registration operating element 106 and/or 316.

The machine tools 20A, 20B communicate using the energy storage modules 40A, 40B with the vacuum cleaner 70 and can actuate it via control connections S1 and S2. However, control commands cannot be sent directly via the control connections S1, S2, but rather only after a previous registration/authorisation of the machine tools 20A, 20B at the external communication apparatus 100. Consequently, the respective control connection S1, S2 must firstly be established before it is available for the transmission of control commands and/or status signals between the components 20A, 70 or 20B, 70 remote from one another.

The configuration is in this case made such that the machine tools 20A, 20B do not communicate directly wirelessly with the vacuum cleaner 70, but rather using the energy storage modules 40A, 40B assigned to them and attached to them.

However, it is certainly possible that the communication described below in relation to the wireless communication interface 60 is also implementable with a at the machine tool 20B, namely for example directly (not represented), similar to the control connection S2 or indirectly via the communication modules 300B and 300C, as will be clearer.

Essentially, the energy storage modules 40A, 40B form so to speak gateways for the machine tools 20A, 20B for wireless communication, in particular in the control direction, i.e. from the machine tool 20A, 20B to the vacuum cleaner 70. However, the reverse communication direction from the vacuum cleaner 70 to the machine tools 20A, 20B is also possible via the gateways 40A, 40B.

In order that these functions are particularly easy to implement, the energy storage modules 20A, 20B are smart such that they can identify for example whether they are connected to a device requiring wireless communication with the vacuum cleaner 70 or a device even implementing such communication or to another device, for example a machine tool, which is not suitable for the vacuum cleaner operation, for example a screwing device, a gluer or the like. In particular, the energy storage modules 40A, 40B can detect whether they are connected to the charging device 220.

The charging device 220 sends, namely for example via the bus interface BU, a request message 700 to the control device 46 with which it requests the current charge status of the energy storage device 42, the status and/or the maximum charge voltage for the storage cells 43, maximum charging currents or the like. The control device 46 responds with a response message 701 in which the corresponding information is stored. Using the quality of the request message 700, namely for example the fact that a level of a maximum permitted charging current is requested, the energy storage module 40 identifies that it is connected to a charging device and not to an electric consumer in the manner of the machine tool 20A or 20B which requires a wireless communication connection to a vacuum cleaner.

However, other information can also be evaluated by the energy storage module 40 to recognise the connection to a charging device in the manner of the charging device 220. Thus, a charging voltage UL, which is provided by the charging device 220, is higher than a supply voltage UV, which is applied at the connection of an electric consumer between the lines L1 and L2 or the supply contacts 52A, 52B.

The control device 46 is supplied with electric energy via the bus interface or data interface 54. The supply voltage UB2 applied at the supply line VD or the data contact 53A, which is provided by the charging device 220, differs in its voltage amount from the supply voltage UB1, which the electric hand-held machine tool 220 provides at the data contact 53A. The supply voltage UB1 is for example 3 volts, the supply voltage UB2 5 volts.

For example, a voltage measuring device 61, in particular a voltage sensor, resistance circuitry or the like is provided at the data interface 54 to detect the different voltage amounts of the voltages UB1 and UB2 such that the control device 46 can identify whether it is connected to a charging device (charging device 220) or to an electric consumer or an electric machine tool in the manner of the machine tools 20A, 20B.

It is possible that the control device 46, depending on whether the energy storage module 40 is connected to a machine tool 20 or to the charging device 220, changes an operating mode of the wireless communication interface 60. For example, the control device 46 activates the wireless communication interface 60 when the energy storage module 40 is connected to a machine tool 20, while it deactivates the wireless communication interface 60 when the energy storage module 40 is connected to the charging device 220.

It is also possible that the control device 46 does not deactivate the wireless communication interface 60, when the energy storage module 40 is connected to a machine tool 220, but changes the communication mode. Thus, the wireless communication interface 60 can for example remain active for communication with the configuration device 500 still to be explained, in particular a smartphone when the energy storage module 40 is not connected to the machine tool 20, for example is connected to the charging device 220 or has no such connection. Using the configuration device 500, for example the smartphone, program data or the like can for example be transmitted to the energy storage module 40, even if this is not connected to the machine tool 20.

However, when the energy storage module 40A or 40B is connected to the machine tool 20A or 20B, the wireless communication with the vacuum cleaner 70, in particular its external communication apparatus 100 is easily possible without problems.

A function and communication process 400 begins for example with an operating action 401 of an operator N. The operator N of the system 10 connects for example the vacuum cleaner 70 to the supply network EV or actuates the switch or the switching element 78 such that the vacuum cleaner is essentially operationally ready, i.e. has a function 410 "status in operation".

A control device 117 of the external communication apparatus 100 switches at this point into a status 411 in which the external communication apparatus searches for devices already authorised to actuate the vacuum cleaner 70. This status 411 lasts for example a predetermined time, in particular one minute or two minutes, after which it ends once again. This time limitation is an option that reduces the risk of unauthorised access to the vacuum cleaner 70.

In order to perform this functionality and the following functionalities, the control device 116 has for example a processor 117 to execute the program code of a program module 119 which is stored in a memory 118 of the external communication apparatus 100.

A function 412 of the program module 119 enables for example the detection of information of the registration operating element 106. Thus, if the operator for example in a step 413 actuates, in particular presses the registration operating element 106, the registration operating element reports the function 412 using an output command 414 to the operator N by it namely actuating the display device 114 such that the operator sees that the external communication apparatus 100 and therefore the vacuum cleaner 70 is ready to establish new control connections. The external communication apparatus 100 goes into a status 415, namely into an operation standby mode in which a control connection can be established with the external configuration apparatus 100.

The communication module 40 is thus inactive at the start of the function and communication process 400 in a status 430 "sleep". Proceeding therefrom, a number of scenarios are possible to establish one of the control connections S1 or S2, of which a first scenario is described below:

The operator N actuates for example the switching element 24 of the machine tool 20A in order to switch it on. The machine tool 20A or the assigned energy storage module 40A is still, however, not authorised to output switching commands or control commands to switch on the suction unit 75. Such a registration or authorisation, however, occurs automatically so to speak when the operator N simply actuates the switching element 24.

If the operator N actuates the switching element 24, the communication relation between the machine tool 20A and the energy storage module 40A is actively switched and/or established. The energy storage module 40, thus each of the energy storage modules 40A, 40B identifies from operational information coming from the actuation of the switching element 24 that a device suitable for establishing and using a control connection is connected to the device interface 50.

The energy storage module 40 can thus for example identify using the supply voltage UV that an electric consumer is connected. The voltage UV differs from the voltage UL of the charging device 220.

Further operational information can for example also be the supply voltage UB1 which is provided by the control device 26 to the supply line VD or the data contact 53a. The supply voltage UB1 differs from the supply voltage UB2 of the charging device 220, it is in particular lower than it. Therefore, the supply voltage UB1 thus also forms an indicator of an actuation of the switching element 24.

Furthermore, an initialisation communication can be evaluated on the bus BU from the control device 46 as an indicator of the activation of the data interface 54 by a device actuating the vacuum cleaner 70, i.e. the machine tool 20A or 20B (designated below only as machine tool 20). Thus, for example a request message 750 can be sent from the control device 26 to the control device 46, with which for example a supply voltage UV of the energy storage module 40, which can be provided, is queried. In the request message 750, however, data identifying the electric device or the machine tool 20 may be contained, for example an identifier 751 which characterises the machine tool 20A, 20B as a machine tool requiring dust extraction. The request message 750 for example represents operationally ready information of the machine tool 20. With a response message 752, the control device 46 responds to the request message 750 and provides the requested information and/or information, for example charge status of the energy storage module etc.

Coming from the actuation of the switching element 24, the energy storage module 40 sends via the wireless communication interface 60 in a function 431, for example the program module 419, in the context of a transmission operation 432, a registration message 440 to the external communication apparatus 100.

The registration message 440 comprises for example a broadcast transmission identifier 44x, i.e. a registration message, which is directed to a plurality of essentially ready-to-receive vacuum cleaners, not only the vacuum cleaner 70. Furthermore, an authorisation parameter 442 is optionally indicated in the registration message 440. The authorisation parameter 442 comprises for example an essential system compatibility of the energy storage module 40 or the machine tool 20 with the vacuum cleaner 70. The authorisation parameter 442 can for example comprise a manufacturer identifier or the like.

The external communication apparatus 100 receives the registration message 440 with a function 416. The function 416 is active for a predetermined time period, for example 500 msec to 1000 msec because in this time the registration procedure must be concluded with the registering energy storage module 40. With a registration confirmation message 445, the external communication apparatus 100 confirms the registration of the energy storage module 40. The registration confirmation message 445 is sent in a step or transmission operation 417. The registration confirmation message 445 comprises for example the address identifier 446 of the energy storage module 40 as the sender address. Optionally, further information 447 can be contained in the registration confirmation message 445, for example an access key, a password or the like. The information 447 can, however, also for example identify a suction power of the suction unit 75 that is required or to be set or other similar information favourable to the subsequent operation.

The registration of the energy storage module 40 at the external communication apparatus 100 is, however, only a temporary registration which is necessary for a current operation. Accordingly, a temporary identifier 443 is advantageously contained in the registration message 440 such that the external communication apparatus 100 knows so to speak that only a temporary registration or temporary control connection is desired.

At this point, a difference with the so to speak permanent registration for example of the communication module 300 is also clear. In order to register the communication module 300, a longer or more difficult operating action of the operator N is necessary, namely for example a longer actuation of the registration operating element 106 than in the case of a temporary registration. In the case of a standby mode for a permanent control connection or communication relation, the external communication apparatus 100 in the case of the output command 414 gives a signal different with respect to the registration for a temporary control connection to output to the display device 114, for example for more rapid flashing of the LEDs or flashing of the LEDs at shorter frequency. Lastly, the communication module 300 does not indicate in a registration message comparable with the registration message 440 the temporary identifier 443, but rather a permanent identifier.

When the wireless communication interface 60 or the energy storage device 40 is successfully registered at the vacuum cleaner 70 or the external communication apparatus 100, both components go into a status 418 "connected". The permanently registered communication module 300 would also adopt this status. It should be added that the function 431 advantageously comprises a time limitation. If a registration confirmation message 445 does not arrive within a predetermined or settable time, for example 500 to 1000 msec after switching on the switching element 24 and/or after sending the registration message 440, the registration attempt fails so to speak.

Proceeding from the status 418 "connected", an authentication procedure and/or an encryption procedure is advantageously provided. The subsequently established control connection S1 or S2 should namely advantageously take place in an authenticated and/or encrypted manner.

For example, the external communication apparatus 100 transmits with an encryption parameter 451. When namely a previous encryption or previous communication has already existed between the external communication apparatus 100 and one of the energy storage modules 40A, 40B, the external communication apparatus 100 uses the already existing parameters. For example, the address identifier 446 and assigned thereto the encryption parameter 451 of an already previously existing control connection to the energy storage module 40A, 40B are stored in the memory 118 of the external communication apparatus.

For example, it is mentioned that other address identifiers and assigned encryption parameters can also be stored in the memory 118, for example an address identifier 446C of the wireless communication interface 60C and an encryption parameter 451C for a control connection between the wireless communication interface 60C of the machine tool 20B and the external communication apparatus 100.

It should be mentioned at this point that the external communication apparatus 100, when encryption parameters for the respective energy storage module 40 are not known, sends, using a message 455, the encryption parameter 451 or a new, different encryption parameter 456 such that an encrypted communication between the components 100, 40 is possible and therefore the status 421 "encrypted connection" is achieved.

Optionally, the external communication apparatus 100, in particular its control device 116, controls the display device 114 (step 423A) such that it signals the available, encrypted connection. For example, the display device 114 then permanently illuminates.

It is also possible that a plurality of address identifiers and/or encryption parameters is stored at an energy storage module. Thus, for example in the case of the energy storage module 40 or the control apparatus 46, provision can be made for it to have stored address data and encryption data of a further vacuum cleaner not represented in the drawing, namely for example an address identifier 441B and an encryption parameter 451B of this further vacuum cleaner. Therefore, the energy storage module 40 can also, if required, so to speak access other vacuum cleaners directly.

Coming back to the function/communication process 400, the further communication takes place for example as follows:

In a function 433 "switch on", the energy storage module 40 sends in a transmission operation 434 for example the control device 46 for example a control command 460 which contains a switch-on identifier 461. In addition, the control device 46 activates in an activation step 435 the display device 44 to display the established control connection S1 or S2. For example, the lights 445 illuminate blue or in a pattern different to the display of a charge status.

After receiving the control command 460, the external communication apparatus 100 for example actuates the control device 86 such that it switches on the suction unit 75 in a step 422. In addition, the external communication apparatus 100, in particular its control device 116, controls the display device 114 (step 423) such that it signals the switching-on of the suction unit 75. For example, the display device 114 then permanently illuminates.

When the operator N releases the switching element 24, the current flow via the drive motor 22 for example ends. The control device 46 can detect this, for example using a corresponding current sensor 62. The supply voltage or bus voltage UB1 is in this case also lower or smaller. Furthermore, it is possible that the energy storage module 40 actively sends the data interfaces or bus interfaces 34, 54 a message 753 "motor switched off". One or a plurality of these trigger events, which are triggered by the operating step 403 of the operator N, lead to a function 436 "switch off" of the energy storage module 40. This then sends in a transmission operation 437 a control command 462 to switch off the suction unit 75, preferably after a predetermined stopping time for the suction unit 75, with the message or the control command 462 containing a switch-off identifier 463. In the switch-off identifier 463, for example a stopping time for the vacuum cleaner 70 or the suction unit 75 is indicated.

The request message 750 and the message 753 form received information EM, which the energy storage module 40 receives at the data interface 54, in order to output namely for example the registration message 440 to the wireless communication interface 60 as a function of transmission signals SII.

The response message 445 is for example a received signal ESI, using which the energy storage module 40 outputs the response message 752 to the data interface 54 as transmission information SM.

In a function 427 "switch off", the communication apparatus 100 actuates, directly or actuating the control device 86, the suction unit 75 to switch off and the display device 114 to display the ended actuation. For example, the function 427 gives an actuation command 425 to the suction unit 75 directly or via the control device 86, namely the data interfaces 83 and 108.

When the switching element 24 of the machine tool 20 is actuated again, the energy storage module 40 can send further subsequent control commands 460 and 462 in order to switch on and switch off the suction unit 75. Advantageously, provision is made for the respective control connection between energy storage module and external communication apparatus 100 to end after a predetermined time so that for example the external communication apparatus goes into a status 428 (corresponding to the status 411) and searches for devices authorised to establish a control connection. The energy storage module 40 in contrast goes into a status 439, namely a status "sleep", corresponding to the status 430. When the control connection from the energy storage module 40 to the external communication apparatus 100 or the vacuum cleaner 70 has ended, the function 436 expediently outputs this new operating status to the display device 44, for example by the display device 44 being actuated using an actuation in a deactivation step 438 to signal the ended control connection. The lights 45 then for example no longer illuminate blue, but rather green and signal the charge status of the energy storage device 42.

Furthermore, it is possible that the machine tool 20 sends a configuration message 754 via the bus BU to the energy storage module 40. In the configuration message, for example configuration data 755 is indicated to set the vacuum cleaner 70, for example a required suction power of the suction unit 75, a typical particle amount in the dust generated by the machine tool 20 etc. The energy storage module 40 preferably provides this data via the wireless communication interface 60 to the external communication apparatus 100 to configure the vacuum cleaner 70, for example as configuration message 465. The external communication apparatus 100 provides the configuration data 755 to the control device 86 to further process, in particular suitably actuate the suction unit 75, e.g. using a transmission operation 437'.

It is preferred for the control device 86 and/or the external communication apparatus 100 to permanently store the configuration data 755 and assign it to the respective machine tool 20A and 20B, for example in the memory 88 and/or 118.

Furthermore, it is advantageous for an operator to be able to override the stored configuration so to speak, for example by an actuation of the operating element arrangement 77. Thus, for example a suction power of the suction unit 75 can be set at a switching element 78A.

It is possible that suction parameters set directly by an operator at the vacuum cleaner, in particular suction parameters set at the switching element 78A or other operating elements of the operating element arrangement 77, are permanently stored by the control device 86 and/or the external communication apparatus 100 and assigned to the respective machine tool 20A and 20B, for example in the memory 88 and/or 118 when the vacuum cleaner is currently actuated by the respective machine tool, for example one of the machine tools 20A or 20B. In this scenario, it is possible, however not absolutely necessary, for the configuration data 755 or suction parameters to be sent wirelessly by the machine tool 20A or 20B.

Establishing a control connection can, however, also take place automatically so to speak when an energy storage module 40 and a machine tool 20 are connected together. This is explained below by way of example of one of the energy storage modules 40. However, it is also possible that for example the wireless communication interface 60C in this manner so to speak automatically establishes a respective control connection to the vacuum cleaner 70 or the external communication apparatus 100 when the energy supply is so to speak started by the energy storage module 40 or is arranged on the device interface 30.

Thus, for example the energy storage module 40 and/or the machine tool 20 can have capacity sensors 66, 36 with which capacities C1 and C2 between the supply contacts 32A, 32B or 52A, 52B can be measured. The capacitive relationships change namely between the lines L1 and L2 thus at the energy-supplying contacts or the energy-supplying lines when a respective energy storage module 40 is fastened to a machine tool 20. The sensors 36, 66 are connected with the control devices 26, 46 or communicate therewith. Thus, for example the control device 46, when the sensor 66 identifies that the machine tool 20 is connected, i.e. an operating status is achieved, can automatically send the registration message 440.

In order to identify a separation status and/or an operating status between an energy storage module 40 and a machine tool 20 and/or a vacuum cleaner, at least one verification message in particular provided exclusively to verify the operating status or separation status can be provided to a data interface, for example the bus interface BU. For example, a type of ping message can be provided for this purpose. The processor 27 and/or a processor 27A of the machine tool 20 or of the charging device 220 provided especially for the mentioned purpose can in particular cyclically send a verification message CK, using which the energy storage module 40 identifies for example that it is connected to the machine tool 20 or the charging device 220 or that there is no connection to such a device. It is possible that in order to receive the verification message CK the processor 47 or a processor 47A provided especially for this message is present at the energy storage module 40. The processor 47 and/or 47A can send as the response to the verification message CK for example a response message RP.

In another manner, it can also be sensorily detected whether an energy storage module 40 and a machine tool 20 are in a separation status or another operating status connected to one another, when namely the device interfaces 30, 50 are connected to one another.

Thus, for example a sensor 58 can sense an actuation of the actuation element 57 of the fixing device 55. When an operator pushes the actuation element 57, consequently thus wishes to trigger the fixing of the fixing device 55, this will be assessed as a transition from the operating status to the separation status. The energy storage module 40, in particular the wireless communication interface 60 can in this case for example automatically end the control connection S1 or S2. To this end, the wireless communication interface 60 for example sends a corresponding separation command or a separation message. It is particularly preferred when, through actuation of the actuation element 57, also the vacuum cleaner 70 can also be switched off because the components 20 and 40 are separated from one another. For example, the control device 46 sends the control command 462 when the actuation element 57 is actuated, which can be detected by the sensor 58.

However, it is also possible that for example one or a plurality of motion sensors are provided, namely for example a motion sensor 59 at the energy storage module 40 and a motion sensor 59B at the machine tool 20. When the motion sensors 59, 59B signal the same movements, the control devices 46, 26 can communicate this to one another and as a result identify that the energy storage device 40 and the machine tool 20 are in the operating status, i.e. in the status fastened to one another.

Furthermore, it is possible that for example an optical sensor 68 or another proximity sensor detects when the device interface 30 is fastened to the device interface 50. The optical sensor or proximity sensor 68 is for example marked on the energy storage module 40A according to FIG. 5, but could readily also be provided on the device interface 30 of the machine tool 20 (see FIG. 4).

Like the proximity sensors or optical sensors 68 (ultrasonic sensors, magnetic sensors or the like can also for example be provided), an electric switch 68, in particular a push button or press button is also actuated when the plug positive-locking contours 51 and 31 are engaged with one another, i.e. when the device interfaces 30, 50 are mechanically connected to one another. The electric switch 69 can also therefore distinguish the operating status from the separation status of the device interfaces 30, 50 and lead to the wireless communication interface 60C or the energy storage module 40 sending the registration message 440.

It is also possible that the energy storage module 40 receives in the context of the received information EM at least one status information item, in particular error information and/or switching position of a switch, of the electric device and/or at least one identification information item, for example a serial number of the electric device. Thus, for example the energy storage module 40 can receive error information as status information 29C and identification information 29D for example a unique identifier or a serial number of the machine tool 20, from the machine tool 20. In this case, it is possible that the machine tool 20 sends this received information EM spontaneously via the data interface 54, i.e. without previous request by the energy storage module 40 at the machine tool 20 or that the energy storage module 40 requests this received information EM at the machine tool 20. The error information can for example represent overheating or electric overloading of the machine tool 20. The identification information 29D can also comprise a type identifier, so that for example the type of machine tool 20, in particular screwing device, sawing machine or the like can be identified using the identification information 29D.

The aforementioned received information EM is for example not security-related or to be kept secret. In particular, it is advantageous for the energy storage module 40 to send, in particular encrypted, this received information EM in the context of a broadcast communication or advertising communication cyclically or periodically and/or at the transition from the separation status to the operating status, i.e. in the case of connection to the machine tool 20. Of course, encrypted communication can also take place when for example encryption parameters are already exchanged between the energy storage module 40 and the configuration apparatus 500 or another receiving device. In all aforementioned scenarios, for example the configuration apparatus 500 can receive the identification information 29D and/or the status information 29C from the energy storage module 40.

The vacuum cleaner 70 can, as explained, have one or a plurality of communication modules 300. The arrangement with a plurality of configuration modules 300A, 300B and 300C is optional, i.e. only one of these communication modules could for example be provided or even none of them. The vacuum cleaner 70 would still function.

The communication modules 300A can be used using their communication interfaces 311 to maintain or establish a control connection. Thus, for example a control connection S6 can be established by the hand-held machine tool 20B or the energy storage module 40B to the vacuum cleaner 70 or the external communication apparatus 100, which is established and/or maintained at least partially by the communication module 300B and 300C.

Thus, for example the wireless communication interface 60C of the machine tool 20A or the wireless communication interface 60 of the energy storage module 40B can communicate on a section S61 firstly with the communication module 300, for example in order to send the control command 460 and/or 462, i.e. to switch on and switch off the suction unit 75. On a communication section or connection section S6.2, the communication module 300 communicates this information or this control command to the communication module 300B which in turn provides the received control command or the received information on a connection section S63 to the external communication apparatus 100 or the vacuum cleaner 70. Since the communication modules 300B and 300C are arranged only at a short distance to the system components 20B/40B, on the one hand, and, on the other hand, to the vacuum cleaner 70 or the communication device 100, the connection sections S61 and S63 are short. Accordingly, the transmission power of the external communication apparatus 100 and of the wireless communication interface 60/60C can be particularly low.

In particular on a short transmission path between the respective communication module 300B and the wireless communication interface 60, 60C or the communication module 300C and the external communication device 100 not only is the transmission power particularly low, but the security aspect is also particularly favourable. For example, the receiving ranges of the communication modules 300B and 300C can be designed short such that interrupting information of a third party or an interrupting control command is not even received and provided by the communication modules 300B and 330C.

Of course, the communication modules 300B and 300C can also provide information sent by the vacuum cleaner 70 to the energy storage module 40B or the machine tool 20B, i.e. they can operate unidirectionally either from the vacuum cleaner to the machine tool or vice versa from the machine tool to the vacuum cleaner or even bidirectionally. The gateway function is expediently bidirectional. Thus, the vacuum cleaner 70 can for example communicate via the control connection S6, which is in this case a reporting connection, for example a fill level of the dirt collection chamber 73 such that the machine tool 20B possibly adjusts its operation when dust discharge is no longer possible.

The communication modules 300A and 300B can also readily in this manner implement a gateway function in relation to the machine tool 22A and the vacuum cleaner 70.

It is not absolutely necessary that, in order to implement the gateway function, two communication modules are provided, of which one is arranged closer to the vacuum cleaner and the other closer to the machine tool or its energy storage module. For example, it is possible that a communication module 300, for example the communication module 300A serves as a gateway between the external communication apparatus 100 and the energy storage module 40A.

The communication modules can also assist with establishing communication relations and in particular control connections. Furthermore, a communication module 300 can also be authorised in the following manner for the controlling or communicating wireless connection with the external communication apparatus 100.

For example, the external communication apparatus 100 has a communication interface 109 according to a second standard, which differs from the communication interface 110. For example, the first standard of the communication interface 110 is a Bluetooth WLAN or the similar other standard, while the second standard of the communication interface 109 is configured for near-field communication, for example is an RFID communication interface or a NFC communication interface.

Further components of the system 10 also expediently have further communication interfaces of this second standard. Thus, for example in the case of the communication module 300, such a communication interface 318 is present. The energy storage module 40 can also have such a communication interface of the second standard, namely a communication interface 67. Lastly, the communication interface of the second standard can also be provided directly on or in the vacuum housing 71, in particular as a communication interface 84.

The communication interfaces of the second standard, for example of the near-field communication standard serve to store and/or transmit communication parameters which are required for the control connections or reporting connection S1, S2. Control connections S3 and S4 of the communication modules 300A and 300B, with which they actuate the vacuum cleaner 70, for example switch on and switch off the suction unit 75, can in this manner so to speak be authorised or parameterised. Lastly, the gateway function, i.e. the control connection S6 can be set using the communication interfaces of the second standard.

Some variants are preset as follows:

For example, in the case of the communication interface 84 and/or communication interface 109, the address identifier 441 of the vacuum cleaner 70 and the encryption parameter 451 are stored as communication parameters 85, which are required to establish a control connection with the vacuum cleaner 70 or the external communication apparatus 100. When one of the communication modules 300A, 300B or 300C enters with its communication interface 318 in the transmission range of the communication interface 109 and/or the communication interface 84, it can read the communication parameters 85. The reverse approach is also possible that for example the communication parameters of the communication module 300 are stored therein and can be read by one or both of the communication interfaces 109, 84.

However, the wireless communication interfaces 60 or 60C can also be configured in this way. Thus, for example the communication interface 37 of the machine tool 20 can read the communication parameters 85 when it is in proximity to the communication interface 84. A respective energy storage module 40 can also read, using its communication interface 67, the communication parameters 85 from the communication interface 84 and/or 109 or receive said communication parameters therefrom.

In order to establish a control connection of the communication module 300 and/or the energy storage module 40B to the external communication apparatus 100, a communication interface 909 can also be implemented in the shape of for example an NFC transmitter or RFID transmitter. The communication interface 909 is for example arranged on the longitudinal end region 17 of the suction hose 15. For example, the communication interface 909 comprises communication parameters for the first standard which can be read by a corresponding reading communication interface 910 of the vacuum cleaner 70 or 870. The communication interface 109 can for example be an RFID tag, NFC tag or the like. In the case of the communication interface 909, further parameters 911 can also be stored, for example a hose geometry of the suction hose 15, in particular its length and/or diameter, etc., and these further parameters 911 can be read by the communication interface 910.

Furthermore, it is possible that one or a plurality of communication interfaces of the second standard so to speak serve as transfer communication parameters. For example, the communication module 300B can directly read the communication parameters 85 on the vacuum housing 71, namely on the communication interface 84 and/or 109 and then transmit these to the machine tool 20B and/or the energy storage module 40B. The communication module 300B is in this case so to speak an intermediate memory for the communication parameters 85.

A further possibility to switch the external communication apparatus 100 or the vacuum cleaner 70 to the standby mode to establish a control connection, is implemented for example by an acceleration sensor or motion sensor 312. The acceleration sensor 312 sends acceleration signals to the control device 336 which identifies, using the movement signals or reporting signals of the acceleration sensor 312, a typical plug movement or installation movement of the suction hose 15 on the machine tool 20A, 20B. For example, the control device 336 identifies, using the acceleration sensor 312, a typical insert movement, which represents a linear movement and/or rotational movement, which has a predetermined length, namely the insert path when plugging the suction hose 15 on one of the suction outlets 39.

Furthermore, it is possible that using a further motion sensor, which is on board the energy storage module or the machine tool, a movement pattern is identified. Thus, for example the motion sensor 59 of the energy storage module 40 can detect a movement pattern and transmit this via the wireless communication interface 60 to the communication module 300. The communication module 300 compares the movement pattern of the motion sensor 59 with a movement pattern of the motion sensor or acceleration sensor 312. If both movement patterns are identical, this is an indication that the suction hose 15 is fastened or will be fastened to the machine tool 20, for example when the movement patterns are directed in the same manner, but opposingly. Using this information, the communication module 300 can for example establish the control connection S1 or S2. The identification of the movement pattern of the acceleration sensor 312 and/or 59 can thus for example trigger the establishment of a respective control connection S1 or S2 and/or the pairing function, in particular sending the registration message 360.

For the configuration and/or control, a device located outside of the system machine tool, energy storage module, suction hose and vacuum cleaner can also be used, namely for example a configuration apparatus 500. The configuration apparatus 500 is for example a computer, in particular a smartphone, a smartwatch, a tablet computer or the like. The configuration apparatus 500 has a housing 501 which is mobile and independent of the suction hose 15 and vacuum cleaner 70. The housing 501 is also not part of one of the machine tool 20 or the energy storage module 40. However, it would be conceivable that for example a module holder 96 is present on the vacuum cleaner 70 into which the configuration apparatus 500 suitable as a remote control can also be inserted. The configuration apparatus 500 has a display device 502 and an input means 503 to output information for the operator N and to input commands. The input means 503 can be part of the display device 502, for example in the manner of a touchpad.

The configuration device 500 has a control device 506 with a processor 507 and a memory 508. One or a plurality of program modules 509, whose program code can be executed by the processor 507, is stored in the memory 508. Furthermore, a configuration module 510 is stored in the memory 508, which may be suitable to configure the control connections S1-S4. The configuration module 510 has program code which can be executed by the processor 507. The configuration apparatus 500 can directly actuate the vacuum cleaner 70 in the manner of the communication module 300. To this end, for example a communication interface 511 is provided, in particular a Bluetooth interface, WLAN interface or the like, which can communicate directly with the external communication apparatus 100. For example, an input at the input means 503 in the manner of an actuation of one of the registration operating elements 316 or 106 is possible. The configuration apparatus 500 then executes for example program code of the configuration module 510 to switch the external communication apparatus 100 to the standby mode in which the energy storage modules 40 or the machine tool 20 can be authorised to establish the control connection.

Furthermore, the configuration apparatus 500 expediently has a configuration interface 512 with the second standard, for example an RFID interface. Therefore, the configuration apparatus 500 can for example read and/or send the configuration parameters 85.

It should be added at this point that of course the machine tools 20 with their communication interfaces 37 of the second standard and/or the energy storage modules 40 with their communication interfaces 67 can be brought directly in proximity to the vacuum housing 71 and/or the external communication apparatus 100 to read the communication parameters 85 and/or to send their communication parameters.

It should be added at this point that of course the machine tools 20 with their communication interfaces 37 of the second standard and/or the energy storage modules 40 with their communication interfaces 67 can be brought directly in proximity to the vacuum housing 71 and/or the external communication apparatus 100 to read the communication parameters 85 and/or to send their communication parameters. Therefore, the machine tools 20 and the energy storage modules 40, just as the vacuum cleaner 70, also form configurations modules with in each case one communication interface of the first and the second communication standard.

Furthermore, the configuration apparatus 500 is for example suitable for loading software or at least one program module, configuration data or the like in one of the energy storage modules 40 and/or one of the machine tools 20. The wireless communication interfaces 60, 60C communicate in this case preferably directly with the communication interface 511 of the configuration apparatus 500. In this way, for example a program module 49 can be transmitted to an energy storage module 40 or a program module 29 to a machine tool 20. Furthermore, for example configuration data 29A, for example operational parameters and/or machine settings (maximum speed, maximum power, use duration limits or the like), for the machine tool 20 can be transmitted. A program module 29 can be transmitted directly for example via the communication interface 60 to the machine tool 20 or indirectly via an energy storage module 40, i.e. its wireless communication interface 60 and via the data interfaces 34, 54 communicating with one another from the energy storage module 40 to the machine tool 20, in particular its control device 26.

Of course, a gateway function of a machine tool to the energy storage module is also possible, i.e. that for example the wireless communication interface 60C receives a program module 49 for an energy storage module 40 and transmits it via the data interfaces 34, 54 to the energy storage module 40.

In the reverse direction, data of the machine tool 20 can be received for example by the energy storage module 40 and transmitted to the configuration apparatus 500, for example protocol data 29B, in particular data of an error memory, a log file or the like. For example errors occurring during the operation of the machine tool 20, in particular temperature exceedances or the like can be contained in the error memory. The log file contains for example data about the use of the machine tool 20. Using the energy storage module 40, which operates so to speak as a gateway, use duration, error situations or the like can be read from the machine tool 20 using the configuration apparatus 500. The machine tool 20 does not need its own radio interface or other wireless interface.

Controlling information can be sent on the control connections S1-S6, for example switching commands for the suction unit 75, dust class, speed setting, power consumption, contact pressure and particular concentration or dust concentration of a respective machine tool 20. Furthermore, configuration of the vacuum cleaner 70 is possible, i.e. that via one or a plurality of control connections S1-S6 configuration data or reporting data are transmitted from the machine tool 20 and/or the energy storage module 40 to the vacuum cleaner 20, for example stopping time after switching off the suction unit, required power of the suction unit or the like.

The configuration apparatus 500 could be registered according to the function and communication process 400 temporarily at the external communication apparatus 100. However, permanent registration is preferred in the manner of the communication modules 300. The registration operating element 106 for example must be pressed for a long time to authorise or register the configuration apparatus 500 at the vacuum cleaner 70 or the external communication apparatus 100. In this way, it is ensured that only an authorised and legitimate device is registered.

A prioritisation and security concept is presented below:

The components of the system 10 permanently registered at the vacuum cleaner 70 for control are provided for priority actuation of the vacuum cleaner 70, e.g. the mains-connected machine tool 20C and the configuration modules 300 and the configuration apparatus 500. When a switch-on signal or switch-off signal for the suction unit 75 comes from one of these components, this is handled by the vacuum cleaner 70, in particular its control device 86, as a priority over a corresponding control command of the machine tools 20A and 20C equipped with energy storage module 40.

Furthermore, operation at one of the operating elements of the operating element arrangement 77 is a priority. Thus, for example when the switching element 78 is actuated, every other control connection is subordinate.

In the case of the remote controls, i.e. for example the communication modules 300 or the configuration apparatus 500, a one-to-one relationship to the vacuum cleaner 70 is provided. Therefore, a remote control cannot erroneously actuate another vacuum cleaner. Similarly, it is always advantageous when always only one machine tool is authorised with energy storage module at the vacuum cleaner 70 and can actuate it. As soon as further or another machine tool is authorised, the authorisation of the previously authorised machine is erased. Therefore, always only one of the control connections S1 or S2 is possible in the case of the specific exemplary embodiment.

Instead of the current detection of the outlet 79 or in addition thereto, a pressurised air detection could also be provided. Therefore, for example a device operating with pressurised air, for example a grinding machine or polishing machine can be connected to the vacuum cleaner 70. If it is switched on or switched off, the suction unit 75 is running or will be switched off again. A corresponding pressurised air sensor is in this case present on the connection device. The connection device can be a flow device, i.e. that pressurised air is, on the one hand, fed into the vacuum cleaner 70 and, on the other hand, is so to speak tapped from the pressurised air machine not represented in the drawing. If a pressurised air machine or mains machine (machine tool 20C) is switched on and is connected to the vacuum cleaner 70, this has the highest priority. The communication modules 300 and the configuration apparatus 500, like the switching element 78, have a medium priority.

The battery machines or machine tools 20A, 20C provided with energy storage modules have the lowest priority.

It may be advantageous for cancelling an authorisation or ending a control connection S1-S6 for this to be triggered by ending the respective energy supply. Thus, when for example an energy storage module 40A, 40B is separated from the machine tool 20A, 20B, the control connections S1 or S2 are automatically ended. Also, when the energy supply 310 of the configuration module 300 is removed, the authorisation at the vacuum cleaner 70 is automatically cancelled. In this case, it is advantageous for the energy storage module 40 or the machine tool 20 to send a switching command to switch off the suction unit 75 in the case of such a separation.

A remote control, for example the communication module 300 or the configuration apparatus 500 is expediently registered with a new identity at the external communication apparatus 100 or the wireless interface 60, when the energy supply has ended, for example the energy supply 310 has been removed. Therefore, for example a new encryption can be configured. When a new identity is available, i.e. for example a new address identifier is available, both communication partners are ready to negotiate new encryption parameters. When wireless communication interfaces 60, 60C concurring with one another wish to establish a control connection with the vacuum cleaner 70 or the external communication apparatus 100, the in each case first registered wireless communication interface 60 is for example accepted. Thus, when for example the switching element 24 of the machine tool 20A is pressed before the switching element 24 of the machine tool 20C during the standby mode of the external communication apparatus 100, the control connection S1 is established as a priority.

Furthermore, it is advantageous that in the case of concurring machines the one that can establish the control connection is the one closer to the receiving external communication apparatus 100. In the exemplary embodiment according to FIG. 1, this could be for example the energy storage module 40A which wishes to establish the control connection S1. For example, the wireless communication interface 60 can write into the registration message 440 signal strength information 448 with the signal strength with which it sends the registration message 440.

Using one of the sensors 111 measuring the signal strength, the external communication apparatus 100 can measure the strength of the signal with which the registration message 440 is received, and compare it with the signal strength information 448. The control device 86 can then determine therefrom a value for a distance between the components 40A and 100.

The wireless communication interface 60C or the energy storage module 40B are, however, still remote from the external communication apparatus 100, thus are treated subordinately.

It is also possible that no signal strength information 448 is contained in the registration message 440. In this situation, the sensor 111 can compare the signal strength of the registration message 440 for example with a threshold value.

Furthermore, it is possible that the sensor 111 for example directly compares the signal strengths of the registration messages 440 of the energy storage modules 40A and 40B with one another and responds exclusively or earlier, i.e. with a shorter response time to the registration message 440 which has a greater signal strength.

Figure 16:
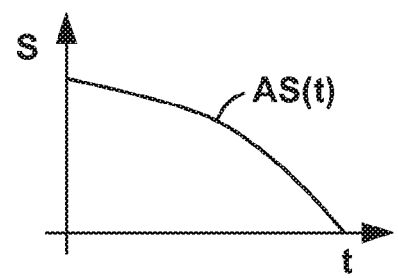
Figure 14:
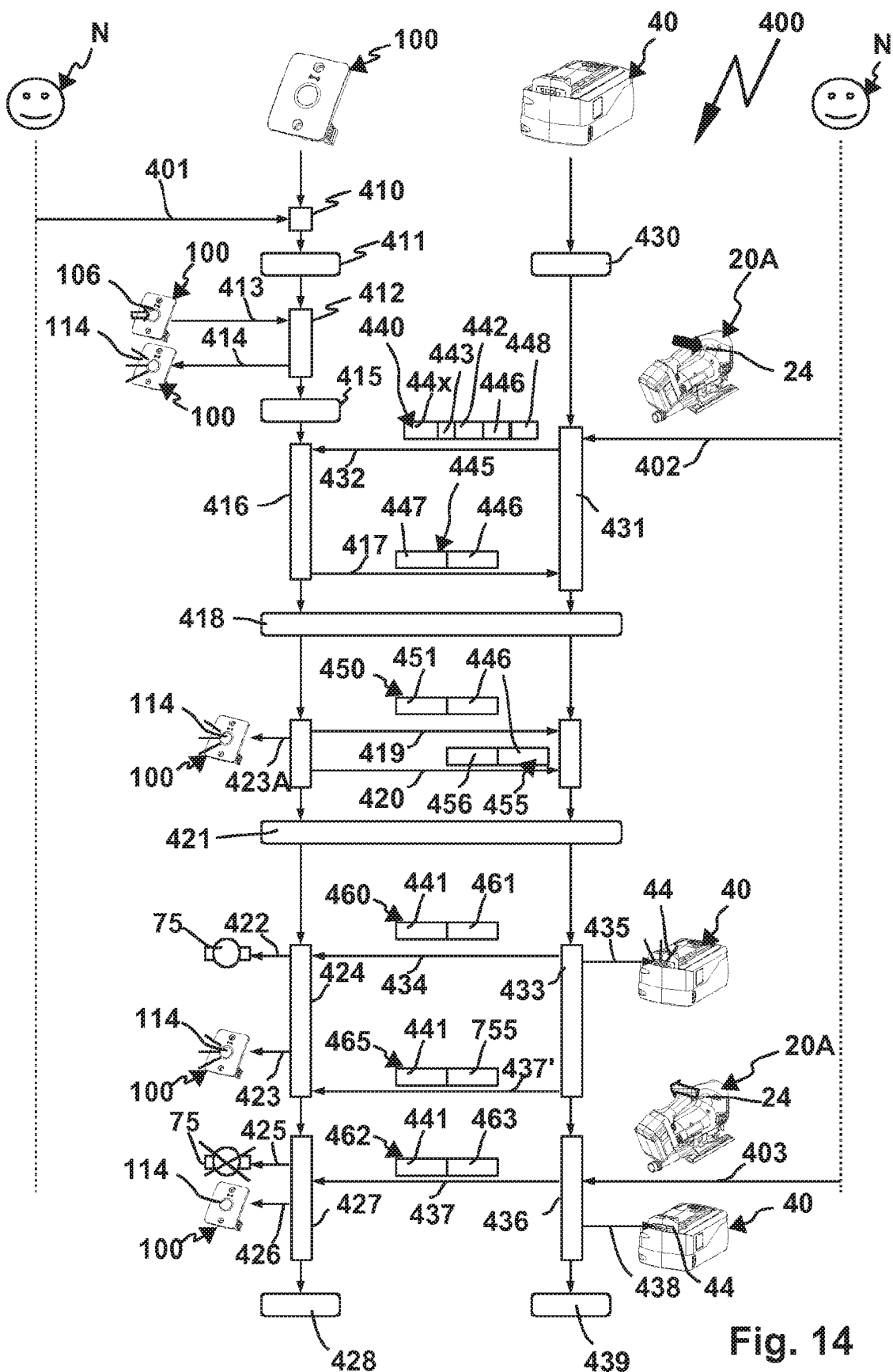

Prioritisation of communication partners arranged closer to the external communication apparatus 100 can for example be provided such that the external communication apparatus 100 sets different response times. This is indicated in FIG. 16. For example, a response time AS(t) is greater or smaller as a function of a signal strength S which the sensor 111 measures. Thus, for example, the external communication apparatus 100 can respond more quickly to the registration message 440 of the energy storage module 40A, which has a greater signal strength, and send a response message, for example the registration confirmation message 445 than to a corresponding registration message 440 of the energy storage module 40B.

It is preferred when the communication parameters stored in the memory 118 of the external communication apparatus 100, for example the address identifiers 451, 451C and the assigned encryption parameters 451, 451C are erased after a predetermined time and/or after complete separation of the energy supply. Even in the case of the mobile device, namely for example the energy storage module 40A, 40B, it is advantageous for the communication parameters to be erased from the memory 48 after a predetermined time and/or after separation of an energy supply.

Furthermore, it is possible that an authorisation of a mobile device, namely a machine tool 20 or an energy storage module 40 at which the external communication apparatus is erased, i.e. that the control connections S1, S2 are considered erased when the respective machine tool 20, its energy storage module 40 has switched on the vacuum cleaner 70, but another function, for example the switching element 78 or the mains machine tool 20C has switched off the vacuum cleaner again.

Furthermore, it is expedient when the communication parameters at a mobile device, which can establish a control connection, are reset in relation to a charging operation, when for example the energy storage module 40 is connected to the charging device 220, the parameters 441, 451 are erased.

By corresponding actuation of the registration operating element 316 of the communication module 300, for example a correspondingly long pressing, a wireless communication connection can also be established between the communication module 300 and the configuration apparatus 500, e.g. for a software update or the like.

A system represented in FIG. 15 comprises a machine tool 20D which is a mains-connected machine tool or a machine tool operable with an energy storage module 40D. The energy storage module 40D and a further energy storage module 840, which is suitable for operating a vacuum cleaner 870, functionally correspond to the energy storage module 40B. The structure is also discernible from the drawing itself.

The machine tool 20D is for example a grinding device for grinding a workpiece W. Using the suction hose 15 and the connection piece 17, the machine tool 20D can be connected to the vacuum cleaner 870, namely to a suction inlet 872.

The vacuum cleaner 870 is a stackable vacuum cleaner arranged in a stacking box. For example, it has a box-shaped vacuum housing 871 which can be stacked on, under or in a stack, which also has for example containers to store hand-held tools, machine tools, e.g. the machine tool 20D and the like. No further detail is given on the connection components to form such a stack. A plurality of coupling elements 801, for example latches, locks or the like can be discerned for example at the front side of the vacuum housing 871 to couple with a container stacked on top and/or below.

A suction unit 875 in the manner of suction unit 75 is arranged in the interior of the vacuum housing 871, which is closable with a lid. A filter 874 and a dirt collection chamber 873 are also located there, in particular in a container removable from the vacuum housing 871. A device interface 830 is provided on the outside or in the interior of the vacuum housing 871, which is compatible with the device interface 50 of the energy storage module 840 such that the vacuum cleaner 870 is operable with the energy storage module 840.

The energy storage module 840 can now communicate directly with the energy storage module 40D. Thus, the machine tool 20D can actuate via its energy storage module 40D the energy storage module 840D which in turn actuates the vacuum cleaner 870 to switch on and/or switch off the suction unit 875. In this case, the communication takes place via the already explained data interfaces 34, 54 between the respective first and second system components, namely the machine tool 20D and the energy storage module 40D and the vacuum cleaner 870 and the energy storage module 840. It should be mentioned at this point that the registration using for example the registration message 440 is also possible in the case of the system according to FIG. 15. However, it is also possible that the energy storage modules 40D and 840 already represent a communication pair, which is authorised for mutual communication. Therefore, operator interventions are not necessary in order to establish the control connection between the vacuum cleaner and the machine tool.

It is possible that the machine tool 20 and/or the charging device 220 periodically or cyclically switches on the supply voltage UB1 or supply voltage UB2 so that the energy storage module 40 identifies that it is connected to the machine tool 20 or the charging device 220, in particular in the case of the connection to the machine tool 20, when it is switched off, in order to maintain a corresponding control connection to for example the vacuum cleaner 60 or in the case where the connection to the charging device 220 does not have to establish such a control connection.

A preferred design provides for an energy storage module 40 and/or configuration apparatus 500 and/or at least one communication module 300, when there is already an authorisation at the vacuum cleaner 60 or the external communication apparatus 100, to firstly again receive a connection to this so to speak stored vacuum cleaner. An authorisation is in this case already available. In this case, the registration message 440 with the broadcast transmission identifier 44x is so to speak omitted, i.e. a registration message, which is directed to a plurality of essentially ready-to-receive vacuum cleaners, not only the vacuum cleaner 70. Advantageously, a registration message 440 in this case expediently contains an address identifier of the vacuum cleaner 70.

| 10 | System | 60 | Wireless communication interface |
|---|---|---|---|
| 11 | First system component | 61 | Voltage measuring device |
| 12 | Second system component | 62 | Current sensor current sensors |
| 13 | | 63 | |
| 14 | | 64 | |
| 15 | Suction hose (15) | 65 | |
| 16 | Longitudinal end | 66 | Capa sensor |
| 17 | Longitudinal end | 67 | Communication interface of second standard RFID |
| 18 | Branch | 68 | Optical sensor proximity sensor |
| 19 | Longitudinal end | 69 | Electric switch |
| 20 | Machine tool AB | 70 | Vacuum cleaner |
| 21 | Machine housing AB | 71 | vacuum housing 871 |
| | | 71A | rollers |
| | | 71B | |
| 22 | Drive motor | 72 | Suction inlet 872 |
| 23 | Tool holder AB | 73 | Dirt collection chamber 873 |
| 24 | Switching element | 74 | Filter |
| 24A | Switch | 75 | Suction unit |
| 25 | Switching element | 76 | Mains connection device |
| 26 | Control device | 77 | Operating element arrangement |
| 27 | Processor | 78 | Switching element |
| 28 | Memory | 78A | Switching element |
| 29 | Program modules | 79 | Outlet |
| 30 | Device interface | 80 | Contacts |
| 31 | Plug counter positive-locking contours | 81 | Current sensor |
| 32 | Device supply contacts | 82 | Input/output interface |
| 33 | Data contacts | 83 | Data interface for 100 |
| 34 | Data interface | 84 | Communication interface of second standard RFID |
| 35 | Fixing contour | 85 | Communication parameters |
| 36 | Capa sensor | 86 | Control device |
| 37 | Communication interface of second standard RFID | 87 | Processor |
| 38 | Tool | 88 | Memory |
| 39 | Suction outlet | 89 | Program modules |
| 40 | Energy storage module AB | 90 | Module holder |
| 41 | Module housing (41) AB | 91 | Contact arrangement |
| 42 | Energy storage device | 92 | Side walls |
| 43 | Storage cell | 93 | Bottom |
| 44 | Display device charge status | 94 | Screw holder |
| 45 | Lights LED 44A speaker | 95 | Front wall of 77 |
| 46 | Control device | 96 | Module holder |
| 47 | Processor | 97 | |
| 48 | Memory | 98 | |
| 49 | Program modules | 99 | |
| 50 | Device interface | 100 | External communication apparatus |
| 51 | Plug positive-locking contours | 101 | Contact arrangement |
| 52 | Supply contacts | 102 | Side wall surfaces |
| 53 | Data contacts | 103 | Rear side |
| 54 | Data interface | 104 | Screw holder |
| 55 | Fixing device | 105 | Front wall |
| 56 | Fixing element | 106 | Registration operating element |
| 57 | Actuation element | 107 | Button |
| 58 | Sensor for 57 | 108 | Data interface for 86 |
| 59 | Motion sensor | 109 | Communication interface of second standard RFID |
| | | 110 | Communication interface |
| 30C | Mains connection device | 111 | Signal strength sensor |
| 31C | Plug | 112 | |
| 32C | Contacts | 113 | |
| | | 114 | Display device |
| 220 | Charging device (220) | 115 | |
| 221 | Charging device housing | 116 | Control device |
| 226 | Control device | 117 | Processor |
| 227 | Processor | 118 | Memory |
| 228 | Memory | 119 | Program modules |
| 229 | Program module | UV | Supply voltage |
| 230 | Device interface | VD | Supply line |
| 231 | Plug counter positive-locking contours | CL | Clock line |
| 232 | Device supply contacts | D | Data line |
| 233 | Data contacts | UB | Bus voltage |
| 234 | Data interface | BU | Bus |
| 235 | Voltage transformer | IL | Charging current |
| 236 | Mains connection device | N | Operator |
| 237 | Connection plug | EV | Supply network |
| 238 | Switch | | |
| 300 | Communication module | 500 | Configuration apparatus |
| 301 | Module housing | 501 | Housing |
| 302 | Upper side wall | 502 | Display device display |
| 303 | Forward side wall | 503 | Input means |
| 304 | Rear side wall | | |
| 305 | Longitudinal side wall | 506 | Control device |
| 306 | Lower side wall | 507 | Processor |
| 307 | Hook | 508 | Memory |
| 308 | Hook projection | 509 | Program module |
| 309 | Hook depression | 510 | Configuration module |
| 310 | Energy supply/button cell | 511 | Communication interface |
| 311 | Communication interface | 512 | Communication interface of second standard RFID |
| 312 | Acceleration sensor | | |
| 314 | Display device | | |
| 316 | Registration operating element | | |
| 317 | Button | | |
| 318 | Communication interface of second standard RFID | 700 | Request message charging device |
| | | 701 | Response message charging device |
| 320 | Hose bracket | | |
| 321 | Clamping point | | |
| 322 | Longitudinal end regions | 750 | Request message machine tool |
| 323 | Hook holder | 751 | Identifier |
| 334 | Switching element/on switch | 752 | Response message |

-continued

| | | | |
|---|---|---|---|
| 335 | Switching element/speed | 753 | Message motor switch off |
| 336 | Control device | 754 | Configuration message |
| 337 | Processor | 755 | Configuration data |
| 338 | Memory | 430 | Status sleep |
| 339 | Program module | 431 | Function |
| | | 432 | Transmission operation |
| | | 433 | Function switch on |
| 400 | Function and communication process | 434 | Transmission operation |
| 401 | Step | 435 | Activation step display |
| 403 | Operating step | 436 | Function switch off |
| 410 | Status in operation | 437 | Transmission operation |
| 411 | Status searching for authorised devices | 438 | Deactivation step display |
| | | 439 | Status sleep |
| 412 | Function | 440 | Registration message |
| 413 | Step | 44x | Broadcast transmission identifier |
| 414 | Output command | 441 | Address identifier vacuum cleaner |
| 415 | Status standby mode | 442 | Authorisation parameter |
| 416 | Function | 443 | Temporary identifier |
| 417 | Transmission operation | | |
| 418 | Status connected | 445 | Registration confirmation message |
| 419 | Transmission operation | 446 | Address identifier energy storage device |
| 420 | Transmission operation | 447 | Information |
| 421 | Encrypted connection | 448 | Signal strength information |
| | | 450 | Message existing encryption |
| 422 | Step | 451 | Encryption parameter |
| 423 | Step | 455 | Message new encryption |
| | | 456 | Encryption parameter |
| 425 | Actuation suction unit | 460 | Control command switch on |
| 426 | Actuation display | 461 | Switch-on identifier |
| 427 | Function shut down | 462 | Control command switch off |
| 428 | Status searching for authorised devices | 463 | Shut-down identifier |
| | | 465 | Configuration message |
| SII | Transmission signals | EM | Received information |
| ESI | Received signals | SM | Transmission information |

The invention claimed is:

1. An energy storage module for use with an electric device in the shape of an electric hand-held machine tool or a vacuum cleaner, wherein the energy storage module has a wireless communication interface for wireless communication with an external communication apparatus arranged remote from the energy storage module and a module housing in which an electric storage device with at least one electrically rechargeable storage cell is arranged and on which a device interface is provided for detachable connection of the energy storage module to the electric device, wherein the device interface has electric device supply contacts to the electric energy supply of the electric device, and wherein the device interface of the energy storage module has a data interface separate from the device supply contacts, for data communication with the electric device, wherein the energy storage module is designed to send transmission signals via the wireless communication interface to the external communication apparatus as a function of received information obtained via the data interface from the electric device and/or to send transmission information to the electric device as a function of received signals received via the wireless communication interface from the external communication apparatus.

2. The energy storage module according to claim 1, wherein the received information comprises at least one operational information item, which displays an operating status or an operational readiness of the electric device connected to the energy storage module, and wherein the energy storage module is designed to send transmission information dependent on the operational information, via the wireless communication interface to switch on or switch off the external communication apparatus and/or to send a registration message to establish a communication connection, in particular control connection with the external communication apparatus.

3. The energy storage module according to claim 2, wherein the operational information or operational readiness of the electric device is dependent on whether an electric drive motor and/or a device controller to control the electric device is switched on, and/or wherein the data interface is activated and/or functionally capable of communication, between the energy storage module and the electric device.

4. The energy storage module according to claim 2, wherein the operational information comprises at least one operational readiness information item, which is transmitted between the energy storage module and the electric device as part of an initialisation communication when the device controller or the electric drive motor is switched on.

5. The energy storage module according to claim 2, wherein the operational information comprises a request of at least one information item characterising the energy storage module, through the electric device at the energy storage module.

6. The energy storage module according to claim 2, wherein the operational information comprises a voltage signal or is formed thereby, wherein the voltage signal is dependent on a supply voltage provided to the data interface by the energy storage module for the electric device and/or by the electric device for the energy storage module and/or wherein the operational information comprises a clock signal of a bus line of the data interface or is formed thereby.

7. The energy storage module according to claim 1, wherein the energy storage module is designed to activate or deactivate the communication with the external communication apparatus as a function of whether the device connected via the device interface to the energy storage module is a charging device provided for electric charging of the energy storage device or a device to be supplied with electric energy by the energy storage module or whether the device interface is unused.

8. The energy storage module according to claim 1, wherein the energy storage module is designed to activate or deactivate and/or adjust the communication with the external communication apparatus as a function of information typical of the charging device and/or as a function of a request of at least one information item at the energy storage module required to charge the energy storage module and/or as a function of received information characterising the electric device as a device not suitable for charging the energy storage module and/or as a device to be supplied with electric energy by the energy storage module.

9. The energy storage module according to claim 1, further comprising an, optical and/or acoustic display device to output at least one communication information item relating to the wireless communication between the energy storage module and the external communication apparatus and/or the data communication with the electric device.

10. The energy storage module according to claim 9, wherein the display device is designed in a first operating mode to output at least one electric characteristic variable of the energy storage module and in a second operating mode to output the at least one communication information item.

11. The energy storage module according to claim 1, wherein the transmission signals generated using received information of the electric device comprise at least one switching signal to switch on and/or switch off the external communication apparatus and/or at least one configuration message to configure the external communication apparatus as a function of a variable characterising the electric device.

12. The energy storage module according to claim 11, wherein the at least one configuration message is provided to configure a working position, of the external communication apparatus.

13. The energy storage module according to claim 1, wherein the electric device connected to the energy storage module is provided and designed for cooperation with a vacuum cleaner, wherein the vacuum cleaner has or forms the external communication apparatus.

14. The energy storage module according to claim 13, wherein the energy storage module is designed to switch, and/or activate or deactivate the vacuum cleaner as a function of whether the device connected via the device interface to the energy storage module is a device suitable for cooperation with the vacuum cleaner and/or requiring the suction function of the vacuum cleaner.

15. The energy storage module according to claim 1, wherein the energy storage module is designed to send a separation signal informing the external communication apparatus, via the wireless communication interface in the case of a separation from the device to be supplied with electric energy and/or in the case of falling short of a predetermined charging status value of the energy storage device.

16. The energy storage module according to claim 1, wherein the energy storage module is designed to transmit at least one software module or program module received via the wireless communication interface and/or configuration data received via the wireless communication interface to the electric device via the data interface and/or to transmit protocol data received from the electric device via the wireless communication interface.

17. The energy storage module according to claim 1, wherein the received information comprises at least one status information item, of the electric device and/or at least one identification information item of the electric device.

18. The energy storage module according to claim 1, wherein the energy storage module is designed to send at least one received information item via the wireless communication interface as a function of a transition from a separation status to an operating status of the device interface or vice versa, wherein the device interface is electrically and/or mechanically separated from the electric device in the separation status and in the operating status it is electrically and/or mechanically connected to the electric device.

19. The energy storage module according to claim 1, wherein the energy storage module is designed to send predetermined received information of the electric device as broadcast information or advertising information via the wireless communication interface.

20. The energy storage module according to claim 19, wherein the energy storage module is designed, in the case of a transition from the separation status to the operating status, to send the predetermined received information of the electric device as broadcast information or advertising information via the wireless communication interface.

21. The energy storage module according to claim 1, wherein the energy storage module forms a system component of a system, which forms the energy storage module and the electric device with a module interface or device interface to connect the device interface of the energy storage module and/or the external communication apparatus.

22. An electric device with an energy storage module according to claim 1.

23. A method for using an energy storage module with an electric device in the shape of an electric hand-held machine tool or a vacuum cleaner, wherein the energy storage module has a wireless communication interface for wireless communication with an external communication apparatus arranged remote from the energy storage module and a module housing in which an electric storage device with at least one electrically rechargeable storage cell is arranged and on which a device interface is provided for detachable connection of the energy storage module to the electric device, wherein the device interface has electric device supply contacts for the electric energy supply of the electric device, further comprising a data communication between the energy storage module and the hand-held machine tool via a data interface separate from the supply contacts, wherein the energy storage module sends transmission signals via the wireless communication interface to the external communication apparatus as a function of received information obtained via the data interface from the electric device and/or sends transmission information to the electric device as a function of received signals received via the wireless communication interface from the external communication apparatus.

* * * * *